US011400695B2

(12) United States Patent
Nakada et al.

(10) Patent No.: US 11,400,695 B2
(45) Date of Patent: Aug. 2, 2022

(54) LAMINATING ACRYLIC THERMOPLASTIC POLYMER COMPOSITIONS

(71) Applicant: KURARAY CO., LTD., Kurashiki (JP)

(72) Inventors: Kanayo Nakada, Tsukuba (JP); Yoshihiro Morishita, Tsukuba (JP); Hiroshi Oshima, Tsukuba (JP)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 16/744,547

(22) Filed: Jan. 16, 2020

(65) Prior Publication Data

US 2020/0147946 A1 May 14, 2020

Related U.S. Application Data

(63) Continuation of application No. 15/569,571, filed as application No. PCT/JP2016/062610 on Apr. 21, 2016, now Pat. No. 10,647,096.

(30) Foreign Application Priority Data

Apr. 28, 2015 (JP) .................................. 2015-091629
Apr. 28, 2015 (JP) .................................. 2015-091630

(51) Int. Cl.
*B32B 27/30* (2006.01)
*C08L 67/00* (2006.01)
*B32B 15/08* (2006.01)
*C08F 297/02* (2006.01)
*B32B 27/10* (2006.01)
*B32B 27/08* (2006.01)
*B32B 21/08* (2006.01)
*C08K 5/00* (2006.01)
*B32B 5/18* (2006.01)
*B32B 27/20* (2006.01)
(Continued)

(52) U.S. Cl.
CPC .............. *B32B 27/308* (2013.01); *B32B 5/18* (2013.01); *B32B 7/12* (2013.01); *B32B 15/08* (2013.01); *B32B 21/08* (2013.01); *B32B 27/08* (2013.01); *B32B 27/10* (2013.01); *B32B 27/12* (2013.01); *B32B 27/20* (2013.01); *B32B 27/22* (2013.01); *B32B 27/30* (2013.01); *B32B 27/304* (2013.01); *B32B 29/08* (2013.01); *C08F 297/026* (2013.01); *C08K 5/0016* (2013.01); *C08K 5/10* (2013.01); *C08K 5/521* (2013.01); *C08L 27/06* (2013.01); *C08L 33/08* (2013.01); *C08L 53/00* (2013.01); *C08L 63/00* (2013.01); *C08L 67/00* (2013.01); *C09J 153/00* (2013.01); *B32B 2262/101* (2013.01); *B32B 2262/106* (2013.01);
(Continued)

(58) Field of Classification Search
CPC ........... B32B 27/308; B32B 5/18; B32B 7/12; B32B 15/08; B32B 21/08; B32B 27/08; B32B 27/12; B32B 27/20; B32B 27/22; B32B 27/30; B32B 27/304; B32B 29/08; B32B 297/02; B32B 5/0016; B32B 5/10; B32B 5/521; B32B 33/08; B32B 63/00; B32B 67/00; B32B 153/00
See application file for complete search history.

(56) References Cited

U.S. PATENT DOCUMENTS 5,264,527 A 11/1993 Varshney et al.
5,294,674 A 3/1994 Varshney et al.
(Continued)

FOREIGN PATENT DOCUMENTS

CN 1466602 A 1/2004
JP 5-140523 A 6/1993
(Continued)

OTHER PUBLICATIONS

Georges Moineau, et al., "Synthesis of fully acrylic thermoplastic elastomers by atom transfer radical polymerization (ATRP), $2^a$," Macromolecular Chemistry and Physics, 2000, vol. 201, No. 11, pp. 1108-1114 (4 sheets).

(Continued)

Primary Examiner — Tae H Yoon
(74) Attorney, Agent, or Firm — Oblon, McClelland, Maier & Neustadt, L.L.P.

(57) ABSTRACT

The invention provides a laminating acrylic thermoplastic polymer composition which is favorably laminated together with a layer including a plasticizer-containing polymer composition while ensuring that the migration of the plasticizer into the acrylic thermoplastic polymer composition layer is small and the resultant laminate attains excellent durability, and also provides a laminate obtained by laminating a layer including the laminating acrylic thermoplastic polymer composition onto one or both sides of a layer including the plasticizer-containing polymer composition. Further, the invention provides a polymer composition which, when the plasticizer-containing polymer described above is a vinyl chloride-based polymer, can keep sufficient adhesive force after being adhered to a layer including such a vinyl chloride-based polymer, and also provides an adhesive product using the composition. The laminating acrylic thermoplastic polymer composition is a composition for lamination with a layer including a plasticizer-containing polymer composition. The acrylic thermoplastic polymer composition includes an acrylic block copolymer (I) including at least one polymer block (A) containing methacrylic acid ester units and at least one polymer block (B) containing acrylic acid ester units; and the acrylic acid ester units constituting the polymer block (B) in the acrylic block copolymer (I) include an acrylic acid ester (1) unit represented by the general formula $CH_2=CH-COOR^1$ (1) (wherein $R^1$ is an organic group having 1 to 3 carbon atoms).

5 Claims, No Drawings

(51) Int. Cl.
  *B32B 29/08* (2006.01)
  *B32B 7/12* (2006.01)
  *C08L 63/00* (2006.01)
  *B32B 27/22* (2006.01)
  *C08L 53/00* (2006.01)
  *C09J 153/00* (2006.01)
  *B32B 27/12* (2006.01)
  *C08L 33/08* (2006.01)
  *C08L 27/06* (2006.01)
  *C08K 5/521* (2006.01)
  *C08K 5/10* (2006.01)

(52) U.S. Cl.
  CPC ..... *B32B 2264/10* (2013.01); *B32B 2264/102* (2013.01); *B32B 2264/104* (2013.01); *B32B 2307/3065* (2013.01); *B32B 2307/4026* (2013.01); *B32B 2307/71* (2013.01); *B32B 2307/712* (2013.01); *B32B 2405/00* (2013.01); *C08L 2205/03* (2013.01); *C08L 2207/04* (2013.01)

(56) References Cited

U.S. PATENT DOCUMENTS

| | | | |
|---|---|---|---|
| 5,530,046 | A | 6/1996 | Miyake et al. |
| 5,591,816 | A | 1/1997 | Varshney et al. |
| 5,668,231 | A | 9/1997 | Varshney et al. |
| 6,329,480 | B1 | 12/2001 | Uchiumi et al. |
| 8,236,417 | B2 | 8/2012 | Morishita et al. |
| 9,969,911 | B2 * | 5/2018 | Nakada ............... C08F 297/026 |
| 2002/0032290 | A1 | 3/2002 | Uchiumi et al. |
| 2004/0034183 | A1 | 2/2004 | Kato et al. |
| 2005/0085592 | A1 | 4/2005 | Taniguchi et al. |
| 2005/0182182 | A1 * | 8/2005 | Morishita ........... C08L 2666/02 524/515 |
| 2005/0272865 | A1 | 12/2005 | Taniguchi et al. |
| 2006/0251888 | A1 | 11/2006 | Lane et al. |
| 2006/0251889 | A1 | 11/2006 | Lane et al. |
| 2006/0251890 | A1 | 11/2006 | Lane et al. |
| 2006/0263596 | A1 | 11/2006 | Bamborough et al. |
| 2007/0212561 | A1 | 9/2007 | Wada et al. |
| 2008/0248296 | A1 | 10/2008 | Shintani et al. |
| 2014/0154450 | A1 | 6/2014 | Yutou et al. |

FOREIGN PATENT DOCUMENTS

| | | |
|---|---|---|
| JP | 1993-140523 | 6/1993 |
| JP | 5-507737 A | 11/1993 |
| JP | 6-93060 A | 4/1994 |
| JP | 6-305093 A | 11/1994 |
| JP | 6-328634 A | 11/1994 |
| JP | 7-186342 A | 7/1995 |
| JP | 9-324165 A | 12/1997 |
| JP | 11-42731 A | 2/1999 |
| JP | 11-263946 A | 9/1999 |
| JP | 11-263947 A | 9/1999 |
| JP | 11-335432 A | 12/1999 |
| JP | 2003-27018 A | 1/2003 |
| JP | 2006-124724 A | 5/2006 |
| JP | 2006-341593 A | 12/2006 |
| JP | 2008-50406 A | 3/2008 |
| JP | 2009-241348 A | 10/2009 |
| JP | 2010-258341 A | 11/2010 |
| JP | 2012-184369 A | 9/2012 |
| JP | 2014-120624 A | 6/2014 |
| TW | I254718 B | 5/2006 |
| WO | 02/26847 A1 | 4/2002 |
| WO | 2005/095478 A1 | 10/2005 |
| WO | 2013-162056 A1 | 10/2013 |

OTHER PUBLICATIONS

Eric A. Grulke, "Solubility Parameter Values," Chapter VII of Polymer Handbook Fourth Edition, Wiley Interscience, 1999, pp. 675-714 (21 sheets).

P.A. Small, "Some Factors Affecting the Solubility of Polymers," Journal of Applied Chemistry, vol. 3, Part 2, Feb. 1953 (11 pages).

Properties of Polymers, Chapter 7, "Cohesive Properties and Solubility," 3rd ed., Elsevier, 1990, pp. 189-225.

Intrnational Search Report dated Jul. 19, 2016 in PCT/JP2016/062610 filed Apr. 21, 2016.

Combined Office Action and Search Report dated May 29, 2019 in Chinese Patent Application No. 201680024852.1, citing documents BT and BU, 15 pages (with English translation of categories of cited documents).

Extended European Search Report dated Dec. 6, 2018 in Patent Application No. 16786396.8, citing document BV.

* cited by examiner

LAMINATING ACRYLIC THERMOPLASTIC POLYMER COMPOSITIONS

CROSS REFERENCE TO RELATED APPLICATIONS

This application is a continuation of U.S. application Ser. No. 15/569,571, filed Oct. 26, 2017, now U.S. Pat. No. 10,647,096, which is a national stage of PCT/JP2016/062610, filed Apr. 21, 2016, which claims priority to Japanese application numbers 2015-091629 and 2015-091630, both filed Apr. 28, 2015. The benefit of priority is claimed to each of the foregoing, and the entire contents of each of the foregoing are incorporated herein by reference.

TECHNICAL FIELD

The present invention relates to an acrylic thermoplastic polymer composition for lamination with a layer including a plasticizer-containing polymer composition. More particularly, the invention relates to a laminating acrylic thermoplastic polymer composition which is favorably laminated together with a layer including a plasticizer-containing polymer composition while ensuring that the migration of the plasticizer into the acrylic thermoplastic polymer composition layer is small and the resultant laminate attains excellent durability. Further, the invention relates to a laminate obtained by laminating a layer including the laminating acrylic thermoplastic polymer composition onto one or both sides of a layer including the plasticizer-containing polymer composition.

The invention also relates to a composition which contains a specific acrylic block copolymer and exhibits excellent adhesive properties with respect to an adherend that includes the plasticizer-containing polymer, for example, a polymer composition including a vinyl chloride-based polymer.

BACKGROUND ART

Conventionally, plasticizers are often added in order to facilitate the mixing and dispersion of materials that form a polymer composition, to enhance molding processability, or to impart performances such as flexibility to molded articles obtained from the polymer composition. Such plasticizers are required, for example, to have excellent plasticizing efficiency, to be highly compatible with resins, to show no migration, and to exhibit outstanding heat stability and light stability. Unfortunately, the fact is that the existing plasticizers do not satisfy all these performances. When a layer including such a polymer composition is used to form a laminate with a layer including another thermoplastic polymer, a high migration leads to a contamination of the other thermoplastic polymer layer and sometimes results in adverse effects such as a separation of the plasticizer-containing polymer composition layer from the thermoplastic polymer composition layer. For example, polymer compositions including a vinyl chloride-based polymer and a plasticizer (generally called soft vinyl chloride-based polymers) are materials which are used in a wide range of applications such as building materials, automobile materials, and electric and electronic materials because of their excellent properties such as flexibility, low price and workability. The use of a plasticizer in soft vinyl chloride-based polymers is indispensable in view of the fact that their excellent properties such as flexibility and workability are attributed to the presence of a plasticizer.

In light of the above aspects, it has been demanded that when a layer that includes a plasticizer-containing polymer composition is laminated together with a layer of another thermoplastic polymer composition, the plasticizer show a low tendency to migrate into the thermoplastic polymer composition layer. For example, techniques are studied in which a specific saponified ethylene-vinyl acetate copolymer is laminated on at least one side of a sheet or film which includes polyvinyl chloride containing a plasticizer (see, for example, Patent Literature 1). Further, studies are made on laminates obtained by uniting an acrylic resin layer and a vinyl chloride-based resin layer containing a specific plasticizer (for example, Patent Literature 2). Further, studies are conducted on laminates obtained by uniting a layer that includes a composition including a methacrylic resin obtained by copolymerization involving a specific UV-absorbing monomer, to an article of a polyvinyl chloride-based resin composition containing a plasticizer (for example, Patent Literature 3).

However, the fact is that when a layer including a plasticizer-containing polymer composition is united together with a layer including an acrylic thermoplastic polymer to form a laminate, the migration of the plasticizer cannot be suppressed sufficiently.

Adhesive products such as adhesive sheets, adhesive films and adhesive tapes have been used in various applications. Adhesives including an acrylic polymer have been traditionally studied for use as the adhesives in adhesive layers of these adhesive products.

Polymers are used as adherends to which such adhesives are adhered. Of such polymers, vinyl chloride-based polymers, in particular, soft vinyl chloride-based polymers have excellent workability and mechanical characteristics, and are studied for use as adherends in a wide range of applications such as building materials, automobile materials, and electric and electronic materials. Vinyl chloride-based polymers, in particular, soft vinyl chloride-based polymers generally contain a migrating component, for example, a plasticizer. The use of a plasticizer in vinyl chloride-based polymers, in particular, soft vinyl chloride-based polymers is indispensable in view of the fact that their excellent properties such as workability are attributed to the presence of a plasticizer.

When an adhesive layer is formed on an adherend which includes a vinyl chloride-based polymer containing such a migrating component, the migrating component present in the adherend migrates into the adhesive layer, sometimes causing adverse effects such as a decrease in cohesive force and a consequent separation.

In light of these aspects, it has been demanded that a migrating component, for example, a plasticizer show a reduced tendency to migrate into an adherend.

Studies are conducted on pressure-sensitive adhesive tapes or sheets which include a vinyl chloride-based polymer containing a specific plasticizer, and a pressure-sensitive adhesive layer (see, for example, Patent Literature 4). Further, techniques are studied in which a primer layer is provided between a sheet made of a vinyl chloride-based polymer and a pressure-sensitive adhesive sheet (see, for example, Patent Literatures 5 and 6). Further, adhesive compositions which include an acrylic copolymer obtained by polymerizing monomer components including an epoxy-containing specific (meth)acrylate are studied for use as pressure-sensitive adhesives for vinyl chloride-based polymer products (see, for example, Patent Literature 7).

CITATION LIST

Patent Literature

Patent Literature 1: JP-A-H06-305093
Patent Literature 2: JP-A-H07-186342
Patent Literature 3: WO 2005/095478
Patent Literature 4: JP-A-2012-184369
Patent Literature 5: JP-A-H11-263946
Patent Literature 6: JP-A-H11-263947
Patent Literature 7: JP-A-H05-140523
Patent Literature 8: JP-A-H06-093060
Patent Literature 9: JP-A-H05-507737
Patent Literature 10: JP-A-H11-335432

Non Patent Literature

Non Patent Literature 1: Macromolecular Chemistry and Physics, 2000, vol. 201, pp. 1108-1114
Non Patent Literature 2: "POLYMER HANDBOOK Forth Edition", VII, Wiley Interscience, 1999, pp. 675-714
Non Patent Literature 3: Journal of Applied Chemistry, 1953, vol. 3. pp. 71-80
Non Patent Literature 4: "Properties of Polymers", 3rd ed., Elsevier, 1990, pp. 189-225

SUMMARY OF INVENTION

Technical Problem

An object of the present invention is to provide a laminating acrylic thermoplastic polymer composition which is favorably laminated together with a layer including a plasticizer-containing polymer composition while ensuring that the migration of the plasticizer into the acrylic thermoplastic polymer composition layer is small and the resultant laminate attains excellent durability. Another object is to provide a laminate obtained by laminating a layer including the laminating acrylic thermoplastic polymer composition onto one or both sides of a layer including the plasticizer-containing polymer composition.

Further objects of the invention are to provide a polymer composition which, when the polymer described above is, for example, a vinyl chloride-based polymer, can keep sufficient adhesive force after being adhered to a layer including such a vinyl chloride-based polymer, and to provide an adhesive product using the composition.

Solution to Problem

According to the present invention, the above objects are attained by:

[1] A laminating acrylic thermoplastic polymer composition for lamination with a layer including a plasticizer-containing polymer composition that contains a plasticizer, wherein the acrylic thermoplastic polymer composition includes an acrylic block copolymer (I) including at least one polymer block (A) containing methacrylic acid ester units and at least one polymer block (B) containing acrylic acid ester units; and the acrylic acid ester units constituting the polymer block (B) in the acrylic block copolymer (I) include an acrylic acid ester (1) unit represented by the general formula $CH_2=CH-COOR^1$ (1) (wherein $R^1$ is an organic group having 1 to 3 carbon atoms).

[2] The laminating acrylic thermoplastic polymer composition described in [1], wherein the acrylic acid ester units constituting the polymer block (B) include an acrylic acid ester (1) unit represented by the general formula $CH_2=CH-COOR^1$ (1) (wherein $R^1$ is an organic group having 1 to 3 carbon atoms) and an acrylic acid ester (2) unit represented by the general formula $CH_2=CH-COOR^2$ (2) (wherein $R^2$ is an organic group having 4 to 12 carbon atoms), and the mass ratio (1)/(2) of the acrylic acid ester (1) unit to the acrylic acid ester (2) unit is 90/10 to 10/90.

[3] The laminating acrylic thermoplastic polymer composition described in [1] or [2], wherein the content of the polymer block (A) in the acrylic block copolymer (I) is not less than 5 mass %.

[4] The laminating acrylic thermoplastic polymer composition described in any of [1] to [3], wherein the weight-average molecular weight (Mw) of the acrylic block copolymer (I) is 30,000 to 300,000; and the content of the polymer block (B) in the acrylic block copolymer (I) is 5 to 95 mass %.

[5] The laminating acrylic thermoplastic polymer composition described in any of [1] to [4], wherein the plasticizer is at least one selected from phthalic acid ester-based plasticizers, trimellitic acid ester-based plasticizers, citric acid ester-based plasticizers, aliphatic dibasic acid ester-based plasticizers, polyester-based plasticizers, phosphoric acid ester-based plasticizers and epoxy-based plasticizers.

[6] The laminating acrylic thermoplastic polymer composition described in any of [1] to [5], wherein the solubility parameter of the plasticizer is 14 to 19 $(J/cm^3)^{1/2}$.

[7] The laminating acrylic thermoplastic polymer composition described in any of [1] to [6], wherein the solubility parameter SP (P) of the plasticizer and the solubility parameter SP (B) of the polymer block (B) in the acrylic block copolymer (I) satisfy the following relationship:

$$SP(B)-SP(P)>0.35.$$

[8] The laminating acrylic thermoplastic polymer composition described in any of [1] to [7], wherein the weight change of the acrylic block copolymer (I) after soaking in di-2-ethylhexyl terephthalate at room temperature for 12 hours is not more than 130%.

[9] The laminating acrylic thermoplastic polymer composition described in any of [1] to [8], wherein the solubility parameter SP (B) of the polymer block (B) in the acrylic block copolymer (I) is not less than 18.1 $(J/cm^3)^{1/2}$.

[10] The laminating acrylic thermoplastic polymer composition described in any of [1] to [9], wherein a polymer present in the plasticizer-containing polymer composition is a vinyl chloride-based polymer.

[11] The laminating acrylic thermoplastic polymer composition described in any of [1] to [10], wherein the acrylic acid ester (1) is methyl acrylate.

[12] The laminating acrylic thermoplastic polymer composition described in any of [2] to [11], wherein the acrylic acid ester (2) is n-butyl acrylate or 2-ethylhexyl acrylate.

[13] The laminating acrylic thermoplastic polymer composition described in any of [1] to [12], wherein the content of the acrylic block copolymer (I) in the laminating acrylic thermoplastic polymer composition is not less than 40 mass %.

[14] A laminate obtained by laminating a layer including the laminating acrylic thermoplastic polymer composition described in any of [1] to [13] onto one or both sides of a layer including the plasticizer-containing polymer composition.

[15] The laminate described in [14], wherein the laminating is performed by thermally melting the layer including the acrylic thermoplastic polymer composition.

[16] An adhesive product including the laminate described in [14] or [15].

Advantageous Effects of Invention

The present invention can provide a laminating acrylic thermoplastic polymer composition which is favorably laminated together with a layer including a plasticizer-containing polymer composition while ensuring that the migration of the plasticizer into the acrylic thermoplastic polymer composition layer is small and the resultant laminate attains excellent durability. The invention can also provide a laminate obtained by laminating a layer including the laminating acrylic thermoplastic polymer composition onto one or both sides of a layer including the plasticizer-containing polymer composition.

Further, the invention can provide a polymer composition which, when adhered to such a polymer as described above, for example, a vinyl chloride-based polymer, can keep sufficient adhesive force with respect to the vinyl chloride-based polymer, and can also provide an adhesive product using the composition.

DESCRIPTION OF EMBODIMENTS

The present invention is described below in detail. In the present invention, "(meth) acrylic acid ester" is a general term of "methacrylic acid ester" and "acrylic acid ester", and "(meth)acrylic" is a general term of "methacrylic" and "acrylic".

The acrylic block copolymer (I) used in the invention includes at least one polymer block (A) containing methacrylic acid ester units and at least one polymer block (B) containing acrylic acid ester units. The acrylic acid ester units constituting the polymer block (B) include an acrylic acid ester (1) unit represented by the general formula $CH_2=CH-COOR^1$ (1) (wherein $R^1$ is an organic group having 1 to 3 carbon atoms).

Examples of the methacrylic acid esters that are structural units of the polymer block (A) include functional group-free methacrylic acid esters such as methyl methacrylate, ethyl methacrylate, isopropyl methacrylate, n-propyl, methacrylate, n-butyl methacrylate, isobutyl methacrylate, sec-butyl methacrylate, tert-butyl methacrylate, n-hexyl methacrylate, cyclohexyl methacrylate, 2-ethylhexyl methacrylate, n-octyl methacrylate, lauryl methacrylate, tridecyl methacrylate, stearyl methacrylate, isobornyl methacrylate, phenyl methacrylate and benzyl methacrylate; and functional group-containing methacrylic acid esters such as 2-methoxyethyl methacrylate, 2-ethoxyethyl methacrylate, 2-(diethylamino) ethyl methacrylate, 2-hydroxyethyl methacrylate, 2-aminoethyl methacrylate, glycidyl methacrylate and tetrahydrofurfuryl methacrylate.

To enhance the heat resistance and durability of the obtainable laminating acrylic thermoplastic polymer composition, functional group-free methacrylic acid esters are preferable among them, and methyl methacrylate, ethyl methacrylate, n-butyl methacrylate, tert-butyl methacrylate, cyclohexyl methacrylate, isobornyl methacrylate and phenyl methacrylate are more preferable. Methyl methacrylate is still more preferable for the reasons that the polymer block (A) has a glass transition temperature suited for thermally molding (generally, 50 to 150° C., preferably 70 to 140° C., and more preferably 80 to 130° C.) and that the polymer block (A) is phase-separated from the polymer block (B) more clearly to provide higher durability of the laminating acrylic thermoplastic polymer composition. The polymer block (A) may be composed of one, or two or more of these methacrylic acid esters. To attain a thermoplastic elastomeric characteristic and a further enhancement in durability, the acrylic block copolymer (I) preferably includes two or more polymer blocks (A). In this case, the polymer blocks (A) may be the same as or different from one another.

The weight-average molecular weight (Mw) of the polymer block (A) is not particularly limited, but is preferably in the range of 1,000 to 80,000, more preferably in the range of 4,000 to 40,000, and still more preferably in the range of 7,000 to 20,000. If the weight-average molecular weight (Mw) of the polymer block (A) is below this range, the acrylic block copolymer (I) that is obtained may exhibit poor cohesive force. If the weight-average molecular weight (Mw) of the polymer block (A) is above this range, the obtainable acrylic block copolymer (I) may exhibit an excessively high melt viscosity and may give rise to poor productivity of the acrylic block copolymer (I) and poor molding productivity (typically, thermally molding productivity) in the production of the laminating acrylic thermoplastic polymer composition. In the present specification, the weight-average molecular weight (Mw) is the weight-average molecular weight measured by gel permeation chromatography (GPC) in terms of standard polystyrenes. The proportion of the methacrylic acid ester units in the polymer block (A) is preferably not less than 60 mass % of the polymer block (A), and is more preferably not less than 80 mass %, and still more preferably not less than 90 mass %, and may be 100 mass %.

The glass transition temperature (Tg) of the polymer block (A) is preferably 50 to 150° C., more preferably 70 to 140° C., and still more preferably 80 to 130° C. In some cases, the glass transition temperature (Tg) of the polymer block (A) is preferably 80 to 140° C., more preferably 100 to 140° C., and still more preferably 120 to 140° C. When the glass transition temperature is in these ranges, the polymer block (A) serves as a physical pseudo crosslinking point at usual temperatures to use of the laminating acrylic thermoplastic polymer composition, with the result that a layer including the acrylic thermoplastic polymer composition comes to exhibit cohesive force and attains excellent adhesive characteristics, durability and heat resistance and also exhibits outstanding thermally molding productivity. The glass transition temperature is an extrapolated onset temperature of a curve obtained by DSC measurement.

The acrylic acid ester units that constitute the polymer block (B) include an acrylic acid ester (1) unit.

Examples of the acrylic acid esters (1) include functional group-free acrylic acid esters such as methyl acrylate, ethyl acrylate, isopropyl acrylate and n-propyl acrylate; and functional group-containing acrylic acid esters such as 2-methoxyethyl acrylate, 2-hydroxyethyl acrylate, 2-aminoethyl acrylate and glycidyl acrylate.

To ensure that the obtainable acrylic thermoplastic polymer composition attains enhanced resistance to plasticizers and to reduce the initial tack of the obtainable composition, functional group-free acrylic acid esters are preferable among them, and methyl acrylate and ethyl acrylate are more preferable, and methyl acrylate is still more preferable. These may be used alone or in combination.

The acrylic acid ester units that constitute the polymer block (B) preferably include the above acrylic acid ester (1) unit and an acrylic acid ester (2) unit represented by the general formula $CH_2=CH-COOR^2$ (2) (wherein $R^2$ is an organic group having 4 to 12 carbon atoms) (hereinafter, the ester is simply written as the acrylic acid ester (2)).

Examples of the acrylic acid esters (2) include functional group-free acrylic acid esters such as n-butyl acrylate, isobutyl acrylate, sec-butyl acrylate, tert-butyl acrylate, amyl acrylate, isoamyl acrylate, n-hexyl acrylate, 2-ethylhexyl acrylate, n-octyl acrylate, isooctyl acrylate, decyl acrylate, isobornyl acrylate, lauryl acrylate, cyclohexyl acrylate, phenyl acrylate and benzyl acrylate; and functional group-containing acrylic acid esters such as 2-ethoxyethyl acrylate, 2-(diethylamino)ethyl acrylate, tetrahydrofurfuryl acrylate and 2-phenoxyethyl acrylate.

For the reasons that the polymer block (B) is phase-separated from the polymer block (A) more clearly to provide an increase in the cohesive force of the obtainable laminating acrylic thermoplastic polymer composition, and that high adhesion is obtained when the composition is laminated with a layer that includes a plasticizer-containing polymer composition, functional group-free acrylic acid esters are preferable among them, and n-butyl acrylate and 2-ethylhexyl acrylate are more preferable. Further, n-butyl acrylate is still more preferable for the reasons that the obtainable laminating acrylic thermoplastic polymer composition attains enhanced resistance to plasticizers, and that the obtainable adhesive composition exhibits excellent adhesive characteristics (such as tack and adhesive force) at low temperatures (10 to −40° C.) and shows stable adhesive force at a wide range of peeling speed. These may be used alone or in combination.

In the polymer block (B), the mass ratio (1)/(2) of the acrylic acid ester (1) units to the acrylic acid ester (2) units is preferably 90/10 to 10/90. When the mass ratio is in this range, an excellent balance is obtained between the resistance to plasticizers derived from the acrylic acid ester (1) units and the adhesion derived from the acrylic acid ester (2) units. Consequently, a layer including the acrylic thermoplastic composition can be laminated with a layer including a plasticizer-containing polymer composition so as to ensure that the migration of the plasticizer into the layer of the acrylic thermoplastic polymer composition is small and the resultant laminate exhibits outstanding durability. From the above points of view, the mass ratio (1)/(2) of the acrylic acid esters is preferably 90/10 to 25/75, more preferably 80/20 to 37/63, and still more preferably 70/30 to 42/58.

When the mass ratio (1)/(2) of the acrylic acid ester (1) units to the acrylic acid ester (2) units is in the range of 90/10 to 10/90, the effects of the acrylic acid ester (1) units in decreasing the initial tack, in decreasing the viscosity and in anchoring are obtained in a well-balanced manner with the wettability derived from the acrylic acid ester (2) units. Consequently, the decrease in initial tack and the increase in adhesive force after heat treatment can be attained at the same time. Further, the storage modulus measured with a rheometer (torsion type) at room temperature (about 25° C.) is controlled to not less than 400,000 Pa and the storage modulus at 130° C. to not more than 400,000 Pa, with the result that low tack at room temperature and high adhesive force after heat treatment can be obtained. From the above points of view, the mass ratio (1)/(2) of the acrylic acid esters is more preferably 80/20 to 15/85, still more preferably 70/30 to 20/80, particularly preferably 60/40 to 22/78, and most preferably 40/60 to 22/78. The mass ratio of the acrylic acid ester (1) to the acrylic acid ester (2) may be determined by $^1$H-NMR measurement.

In another preferred embodiment, the mass ratio (1)/(2) of the acrylic acid ester (1) units to the acrylic acid ester (2) units is 90/10 to 40/60. When the mass ratio (1)/(2) of the acrylic acid ester (1) units to the acrylic acid ester (2) units is in the range of 90/10 to 40/60, the resistance to plasticizers is high and a high cohesive force is obtained when the composition is used as a hot melt adhesive. From the above points of view, the mass ratio (1)/(2) of the acrylic acid esters is more preferably 90/10 to 50/50, still more preferably 85/15 to 60/40, and particularly preferably 80/20 to 70/30.

The upper limit of the proportion of the acrylic acid ester (1) in the polymer block (B) is preferably 90%, more preferably 80%, and still more preferably 70%. The lower limit of the proportion of the acrylic acid ester (1) in the polymer block (B) is preferably 25%, more preferably 37%, and still more preferably 42%.

Examples of the combinations of the acrylic acid esters used for the polymer block (B) include methyl acrylate/n-butyl acrylate, methyl acrylate/2-ethylhexyl acrylate, methyl acrylate/n-butyl acrylate/2-ethylhexyl acrylate, ethyl acrylate/n-butyl acrylate, ethyl acrylate/2-ethylhexyl acrylate, and ethyl acrylate/n-butyl acrylate/2-ethylhexyl acrylate. The acrylic acid ester (1) and the acrylic acid ester (2) used here are more preferably such that the absolute value Δ(1/2) of the difference between the solubility parameter of a polymer of the acrylic acid ester (1) and the solubility parameter of a polymer of the acrylic acid ester (2) is 1.3 to 2.0 $(J/cm^3)^{1/2}$. The values of the solubility parameter of these polymers may be determined by a method similar to the method for calculating the solubility parameter SP (B) of the polymer block (B) described in Examples. Further, for the reasons that tack-free at room temperature and high adhesive force after heat treatment can be obtained, the solubility parameter SP (B) of the polymer block (B) is preferably not less than 18.1 $(J/cm^3)^{1/2}$, and more preferably not less than 18.5 $(J/cm^3)^{1/2}$. Examples of the acrylic acid ester units that give such a value of solubility parameter SP (B) include methyl acrylate and ethyl acrylate.

When the acrylic block copolymer (I) includes two or more polymer blocks (B), the combinations of the acrylic acid ester units constituting these polymer blocks (B) may be the same as or different from one another.

The polymer block (B) may be composed of a random copolymer, a block copolymer, a graft copolymer or a tapered block copolymer (a gradient copolymer) of an acrylic acid ester (1) and an acrylic acid ester (2) that compose the polymer block (B). When the acrylic block copolymer (I) includes two or more polymer blocks (B), the structures of the polymer blocks (B) may be the same as or different from one another. The proportion of the total units of the acrylic acid esters (1) and (2) contained in the polymer block (B) is preferably not less than 60 mass % of the polymer block (B), and is more preferably not less than 80 mass %, and still more preferably not less than 90 mass %, and may be 100 mass %.

The glass transition temperature (Tg) of the polymer block (B) is more preferably −70 to 30° C., more preferably −50 to 25° C., still more preferably −40 to 20° C., and most preferably −30 to 15° C. This glass transition temperature ensures that the obtainable laminate is flexible and high in adhesion and in durability at temperatures to use.

In other cases, the glass transition temperature (Tg) of the polymer block (B) is preferably −50 to 10° C., more preferably −40 to 10° C., still more preferably −40 to 0° C., and most preferably −30 to 0° C. This glass transition temperature ensures that the composition used as, for example, an adhesive, can attain appropriate tack and adhesive force, and further ensures that the composition used as an adhesive exhibits low adhesive force and low tack at room temperature and comes to exert adhesive force after heat treatment.

For the reasons that the plasticizer resistance is high and a high cohesive force is obtained when used as an adhesive, the glass transition temperature is preferably −20 to 10° C.

The acrylic block copolymer (I) attains a high modulus at room temperature by containing the acrylic acid ester (1) with a relatively high Tg (about −40 to +20° C.) and the acrylic acid ester (2) with a relatively low Tg (about −80 to −40° C.) in the specific ratio. Probably because of this, tack at room temperature can be suppressed.

In the acrylic block copolymer (I) used in the invention, it is preferable that a peak temperature of tan δ (loss shear modulus/storage shear modulus) determined from dynamic viscoelasticity in torsional vibration be present at least in the range of −40° C. to 20° C. The peak temperature of tan δ in the above temperature range is derived from the polymer block (B) in the acrylic block copolymer (I). When the peak temperature of tan δ is in the above range, the composition used as, for example, an adhesive, can attain appropriate tack and adhesive force. To attain more appropriate tack and adhesive force, the peak temperature of tan δ is more preferably −30 to 20° C., still more preferably −30 to 10° C., and most preferably −20 to 10° C. For the reasons that the plasticizer resistance is high and a high cohesive force is obtained when used as an adhesive, the peak temperature of tan δ is preferably 0 to 20° C.

As long as the advantageous effects of the invention are not impaired, the polymer block (A) may contain components also found in the polymer block (B), and vice versa. Where necessary, these polymer blocks may contain other monomers. Examples of such other monomers include vinyl-based monomers having a carboxyl group, such as (meth)acrylic acid, crotonic acid, maleic acid, maleic anhydride, fumaric acid and (meth)acrylamide; vinyl-based monomers having a functional group, such as (meth)acrylonitrile, vinyl acetate, vinyl chloride and vinylidene chloride; aromatic vinyl-based monomers, such as styrene, α-methylstyrene, p-methylstyrene and m-methylstyrene; conjugated diene-based monomers, such as butadiene and isoprene; olefin-based monomers, such as ethylene, propylene, isobutene and octene; and lactone-based monomers, such as ε-caprolactone and valerolactone. When these monomers are used, the amount thereof is preferably not more than 40 mass %, more preferably not more than 20 mass %, and still more preferably not more than 10 mass % of the total mass of the monomers used for the individual polymer blocks.

The acrylic block copolymer (I) used in the present invention may have other polymer blocks in addition to the polymer block (A) and the polymer block (B), if necessary. Examples of such other polymer blocks include polymer blocks or copolymer blocks prepared from any of styrene, α-methylstyrene, p-methylstyrene, m-methylstyrene, acrylonitrile, methacrylonitrile, ethylene, propylene, isobutene, butadiene, isoprene, octene, vinyl acetate, maleic anhydride, vinyl chloride and vinylidene chloride; and polymer blocks composed of any of polyethylene terephthalate, polylactic acid, polyurethane and polydimethylsiloxane. In the polymer blocks, hydrogenation products of polymer blocks containing conjugated dienes such as butadiene and isoprene are also included.

When the polymer block (A) is designated by "A" and the polymer block (B) by "B", the acrylic block copolymer (I) is preferably represented by any of the general formulae:

(A-B)n (A-B)n-A

B-(A-B)n (A-B)n-Z (B-A)n-Z wherein n is an integer of 1 to 30, and Z represents a coupling site (a coupling site which results from the reaction of a coupling agent with the polymer end to form a chemical bond). The value of n is preferably 1 to 15, more preferably 1 to 8, and still more preferably 1 to 4. Of the above structures, a linear block copolymer represented by (A-B)n, (A-B)n-A or B-(A-B)n is preferable, and a diblock copolymer represented by A-B and a triblock copolymer represented by A-B-A are more preferable.

The weight-average molecular weight (Mw) of the whole acrylic block copolymer (I) used in the present invention is preferably 30,000 to 300,000. When, in particular, the laminating acrylic thermoplastic polymer composition of the invention is thermally molded by a method such as an extrusion method, an injection molding method, a hot-melt coating method, a T-die method, a blown-film extrusion method, a calendar lamination method or an extrusion lamination method, the Mw is more preferably 30,000 to 200,000 from the point of view of molding productivity such as surface smoothness, and is still more preferably 35,000 to 180,000, and particularly preferably 40,000 to 150,000.

From the point of view of the plasticizer resistance of the laminating acrylic thermoplastic polymer composition of the invention, the Mw is more preferably 50,000 to 300,000, still more preferably 80,000 to 300,000, and particularly preferably 100,000 to 300,000.

To satisfy both thermally molding productivity and plasticizer resistance, the Mw is preferably 50,000 to 200,000, more preferably 80,000 to 180,000, and particularly preferably 100,000 to 150,000.

In some cases, the Mw of the whole acrylic block copolymer (I) is preferably 60,000 to 250,000. When, in particular, the composition is thermally melted by a method such as a hot-melt coating method, a T-die method, a blown-film extrusion method, a calendering method or a lamination method, and used as, for example, an adhesive, the Mw is more preferably 60,000 to 200,000 from the point of view of productivity during the coating process or film production, and is still more preferably 60,000 to 180,000, and particularly preferably 60,000 to 150,000 for the reasons that the viscosity behavior during the process such as extrusion is stable and that the composition exhibits a low viscosity and excellent coatability during the hot-melt coating process. To prevent more effectively the decrease in cohesive force and the consequent separation caused by the migration of a migrating component present in an adherend into the adhesive layer, the Mw is preferably 90,000 to 250,000, more preferably 90,000 to 200,000, and still more preferably 90,000 to 180,000.

For the reasons that the plasticizer resistance is high and a high cohesive force is obtained when used as an adhesive, the Mw of the whole acrylic block copolymer (I) is preferably 100,000 to 300,000, more preferably 120,000 to 250,000, and still more preferably 130,000 to 200,000.

The ratio (Mw/Mn) of the weight-average molecular weight (Mw) to the number-average molecular weight (Mn) of the whole acrylic block copolymer (I) used in the present invention is preferably 1.0 to 1.5. For the reason that a layer including the laminating acrylic thermoplastic polymer composition of the invention exhibits a high cohesive force, a high resistance to plasticizers, and a high cohesive force at high temperature when used as an adhesive, the ratio is more preferably 1.0 to 1.4, and still more preferably 1.0 to 1.3.

The complex viscosity of the acrylic block copolymer (I) used in the invention is preferably not more than 100,000 Pa·s as measured at 130° C. with a rheometer (torsion type). When the complex viscosity is not more than 100,000 Pa·s, the composition can be thermally melted at a relatively low temperature of 140° C. or less, preferably 130° C. or less, to be ready for processes such as hot-melt coating and thermal bonding (thermal lamination). To ensure good hot-melt coatability, the complex viscosity of the acrylic block copolymer (I) at 130° C. is more preferably not more than 50,000 Pa·s.

The storage modulus G' (Pa) of the acrylic block copolymer (I) used in the invention measured at 130° C. with a rheometer (torsion type) and converted into a common logarithm (log G') with base 10 is preferably not more than 5.5. When this value is not more than 5.5, the composition can be thermally melted at a relatively low temperature of 130° C. or less to be ready for hot-melt coating and thermal bonding (thermal lamination). To ensure good hot-melt coatability, the log G' of the acrylic block copolymer (I) at 130° C. is more preferably not more than 5.3.

The content of the polymer block (A) in the acrylic block copolymer (I) used in the invention is preferably not less than 5 mass %, and more preferably 5 to 95 mass %, and the content of the polymer block (B) is preferably not more than 95 mass %, and more preferably 95 to 5 mass %. For the reason that a layer including the laminating acrylic thermoplastic polymer composition of the invention exhibits excellent flexibility, the content of the polymer block (A) is more preferably 15 to 60 mass %, still more preferably 18 to 60 mass %, further preferably 22 to 50 mass %, and particularly preferably 22 to 40 mass %. For the same reason, the content of the polymer block (B) is preferably 85 to 40 mass %, more preferably 82 to 40 mass %, still more preferably 78 to 50 mass %, and particularly preferably the polymer block (B) content is 78 to 60 mass %. For the reason that the composition exhibits excellent performance as an adhesive, the content of the polymer block (A) is preferably 15 to 60 mass %, more preferably 18 to 60 mass %, still more preferably 22 to 50 mass %, and particularly preferably 25 to 40 mass %. For the same reason, the content of the polymer block (B) is preferably 85 to 40 mass %, more preferably 82 to 40 mass %, still more preferably 78 to 50 mass %, and particularly preferably the polymer block (B) content is 75 to 60 mass %. When the content of the polymer block (B) is 85 to 40 mass %, an advantage is obtained in that whitening is unlikely to occur after storage under hot and humid conditions.

The acrylic block copolymer (I) used in the invention preferably has a weight change of not more than 130% after being soaked in di-2-ethylhexyl terephthalate for 12 hours. The weight change is more preferably not more than 110%, still more preferably not more than 100%, particularly preferably not more than 70%, and most preferably not more than 50%. The weight change in this range makes it possible to prevent more effectively the decrease in cohesive force and the consequent separation caused by the migration of a migrating component present in an adherend into the adhesive layer. Examples of the acrylic block copolymers (I) satisfying such characteristics include acrylic block copolymers (I-1) to (I-6) obtained by the methods in Synthetic Examples 1 to 6 described later in Examples.

The acrylic block copolymer (I) used in the invention may be produced by any method deemed as known without limitation as long as a polymer that satisfies the requirements of the invention is obtained. In general, living polymerization of monomers that will form structural units is adopted as a method for obtaining a block copolymer having a narrow molecular weight distribution. Examples of such living polymerization techniques include a method where living polymerization is performed using an organic rare earth metal complex as a polymerization initiator (see Patent Literature 8), a method where living anionic polymerization is performed using an organic alkali metal compound as a polymerization initiator in the presence of a mineral acid salt such as a salt of an alkali metal or an alkaline earth metal (see Patent Literature 9), a method where living anionic polymerization is performed in the presence of an organoaluminum compound while using an organic alkali metal compound as a polymerization initiator (see Patent Literature 10), and atom transfer radical polymerization (ATRP) (see Non Patent Literature 1).

Of the above production methods, living anionic polymerization performed in the presence of an organoaluminum compound while using an organic alkali metal compound as a polymerization initiator, is advantageous in that the obtainable block copolymer shows high transparency, contains less residual monomers and has less odor, and also in that the methacrylic acid ester polymer block attains high syndiotacticity to give rise to an increase in glass transition temperature, with the result that the heat resistance of the laminating acrylic thermoplastic polymer composition of the invention is effectively increased. A further advantage is that the generation of bubbles after the lamination with the composition as an adhesive can be suppressed.

The organoaluminum compound is, for example, an organoaluminum compound represented by the following general formula (3):

$$AlR^3R^4R^5 \qquad (3)$$

wherein $R^3$, $R^4$ and $R^5$ are each independently an alkyl group which may have a substituent, a cycloalkyl group which may have a substituent, an aryl group which may have a substituent, an aralkyl group which may have a substituent, an alkoxyl group which may have a substituent, an aryloxy group which may have a substituent or an N,N-disubstituted amino group; or $R^3$ is any one group of the above groups, and $R^4$ and $R^5$ together form an arylenedioxy group which may have a substituent.

Preferred as the organoaluminum compounds represented by the general formula (3) from the viewpoints of high livingness in the polymerization, easy handlability and the like, are isobutylbis(2,6-di-tert-butyl-4-methylphenoxy)aluminum, isobutylbis(2,6-di-tert-butylphenoxy)aluminum, isobutyl[2,2'-methylenebis(4-methyl-6-tert-butylphenoxy)]aluminum, etc.

Examples of the organic alkali metal compounds include alkyllithiums and alkyldilithiums, such as n-butyllithium, sec-butyllithium, isobutyllithium, tert-butyllithium, n-pentyllithium and tetramethylenedilithium; aryllithiums and aryldilithiums, such as phenyllithium, p-tolyllithium and lithium naphthalene; aralkyllithiums and aralkyldilithiums, such as benzyllithium, diphenylmethyllithium and dilithium synthesized by the reaction of diisopropenylbenzene with butyllithium; lithium amides, such as lithium dimethylamide; and lithium alkoxides, such as methoxylithium and ethoxylithium. These may be used alone or in combination. From the viewpoint of high polymerization initiation efficiency, alkyllithiums are preferable among them, and of these, tert-butyllithium and sec-butyllithium are more preferable, and sec-butyllithium is still more preferable.

The living anionic polymerization is usually carried out in the presence of a solvent inert to the polymerization reaction. Examples of the solvent include aromatic hydrocarbons, such as benzene, toluene and xylene; halogenated hydrocarbons, such as chloroform, methylene chloride and carbon tetrachloride; and ethers, such as tetrahydrofuran and diethyl ether.

The acrylic block copolymer (I) can be produced by, for example, repeating a step of forming a desired polymer block (polymer block (A), polymer block (B) or the like) at an end of a desired living polymer obtained by polymerizing a monomer, a desired number of times, and then terminating the polymerization reaction. Specifically, the acrylic block copolymer (I) can be produced by, for example, carrying out plural polymerization steps including a first step of polymerizing a monomer to form a first polymer block, a second step of polymerizing a monomer to form a second polymer block, and if necessary, a third step of polymerizing a monomer to form a third polymer block, said each step being carried out using a polymerization initiator comprising an organic alkali metal compound in the presence of an organoaluminum compound, and then allowing the active end of the resulting polymer to react with an alcohol or the like to terminate the polymerization reaction. According to such a process as above, a block bipolymer (diblock copolymer) consisting of polymer block (A)-polymer block (B), a block terpolymer (triblock copolymer) consisting of polymer block (A)-polymer block (B)-polymer block (A), a block quaterpolymer consisting of polymer block (A)-polymer block (B)-polymer block (A)-polymer block (B), etc. can be produced.

In the formation of the polymer block (A), the polymerization temperature is preferably 0 to 100° C., and in the formation of the polymer block (B), the polymerization temperature is preferably −50 to 50° C. If the polymerization temperature is lower than the lower limit of the above range, the reaction progresses slowly, and a long time is required for completion of the reaction. On the other hand, if the polymerization temperature is higher than the upper limit of the above range, deactivation of the living polymer end is increased, and as a result, the molecular weight distribution is widened or a desired block copolymer is not obtained. The polymer block (A) and the polymer block (B) can be each formed by polymerization in 1 second to 20 hours.

The laminating acrylic thermoplastic polymer composition of the invention includes the acrylic block copolymer (I) described above. As long as the advantageous effects of the invention are achieved, the content of the acrylic block copolymer present in the laminating acrylic thermoplastic polymer composition is not particularly limited. It is, however, preferable that the content of the acrylic block copolymer (I), with respect to the total amount of the laminating acrylic thermoplastic polymer composition, be not less than 40 mass %, more preferably not less than 50 mass %, still more preferably not less than 60 mass %, and most preferably not less than 80 mass %. The content of not less than 40 mass % of the acrylic block copolymer (I) in the laminating acrylic thermoplastic polymer composition makes it easy to exert characteristics of a layer including the laminating acrylic thermoplastic polymer composition of the invention, or, when the composition is used as an adhesive, the characteristics of the adhesive.

While still achieving the advantageous effects of the invention, the laminating acrylic thermoplastic polymer composition of the invention may contain other polymers and additives such as tackifying resins, softeners, plasticizers, heat stabilizers, light stabilizers, antistatic agents, flame retardants, blowing agents, colorants, dyes, refractive index modifiers, fillers, curing agents, lubricants, anti-blocking agents, ant repellents and rodent repellents. These additional polymers and additives may be used alone or in combination.

Examples of the additional polymers include acrylic resins such as polymethyl methacrylate and (meth)acrylic acid ester polymers or copolymers; olefin-based resins such as polyethylene, ethylene/vinyl acetate copolymer, polypropylene, polybutene-1, poly-4-methylpentene-1 and polynorbornene; ethylene-based ionomers; styrene-based resins such as polystyrene, styrene/maleic anhydride copolymer, high-impact polystyrene, AS resin, ABS resin, AES resin, AAS resin, ACS resin and MBS resin; styrene/methyl methacrylate copolymer; styrene/methyl methacrylate/maleic anhydride copolymer; polyester resins such as polyethylene terephthalate, polybutylene terephthalate and polylactic acid; polyamides such as nylon 6, nylon 66 and polyamide elastomer; polycarbonate; polyvinyl chloride; polyvinylidene chloride; polyvinyl alcohol; ethylene/vinyl alcohol copolymer; polyacetal; polyvinylidene fluoride; polyurethane; modified polyphenylene ether; polyphenylene sulfide; silicone rubber-modified resins; acrylic rubbers; silicone-based rubbers; styrene-based thermoplastic elastomers such as SEPS, SEBS and SIS; and olefin-based rubbers such as IR, EPR and EPDM. Of these, polymethyl methacrylate, (meth)acrylic acid ester polymers or copolymers, ethylene/vinyl acetate copolymer, AS resin, styrene/methyl methacrylate/maleic anhydride copolymer, polylactic acid and polyvinylidene fluoride are preferable, and polymethyl methacrylate, (meth)acrylic acid ester copolymers and styrene/methyl methacrylate/maleic anhydride copolymer are more preferable, from the point of view of the compatibility with the acrylic block copolymer (I) contained in the laminating acrylic thermoplastic polymer composition.

Examples of the (meth)acrylic acid ester polymers or copolymers include polymethyl acrylate, poly-n-butyl acrylate, poly-2-ethylhexyl acrylate, random copolymer of methyl methacrylate and methyl acrylate, random copolymer of methyl methacrylate and n-butyl acrylate, and diblock copolymer and triblock copolymer including at least one polymer block containing methacrylic acid ester units and at least one polymer block containing acrylic acid ester units (these diblock copolymer and triblock copolymer do not include the acrylic block copolymers (I) according to the present invention).

In the case where the laminating acrylic thermoplastic polymer composition of the invention contains a tackifying resin, adhesiveness (self-adhesiveness) may be imparted to a layer that includes the laminating acrylic thermoplastic polymer composition. Further, the use of such a resin makes it easy to control the tack, adhesive force and holding power of the composition used as an adhesive. Examples of the tackifying resins include natural resins such as rosin-based resins and terpene-based resins; and synthetic resins such as petroleum resins, hydrogen-added (hereinbelow, sometimes written as "hydrogenated") petroleum resins, styrene-based resins, coumarone-indene-based resins, phenolic resins and xylene-based resins. When the tackifying resin is added, the content thereof from the points of view of adhesive force and durability is preferably 1 to 100 parts by mass per 100 parts by mass of the acrylic block copolymer (I), and is more preferably 3 to 70 parts by mass, still more preferably 5 to 50 parts by mass, particularly preferably 5 to 40 parts by mass, and most preferably 5 to 35 parts by mass.

Examples of the rosin-based resins include rosins, such as gum rosin, tall oil rosin and wood rosin; modified rosins, such as hydrogenated rosin, disproportionated rosin and polymerized rosin; and rosin esters, such as glycerol esters and pentaerythritol esters of these rosins and modified rosins. Specific examples of the rosins include Pinecrystal KE-100, Pinecrystal KE-311, Pinecrystal KE-359, Pinecrystal KE-604 and Pinecrystal D-6250 (each manufactured by Arakawa Chemical Industries, Ltd.)

Examples of the terpene-based resins include terpene resins having α-pinene, β-piene, dipentene or the like as a main body, aromatic modified terpene resins, hydrogenated terpene resins and terpene phenol resins. Specific examples of the terpene-based resins include Tamanol 901 (manufactured by Arakawa Chemical Industries, Ltd.). Examples of the (hydrogenated) petroleum resins include (hydrogenated) aliphatic ($C_5$ type) petroleum resins, (hydrogenated) aromatic ($C_9$ type) petroleum resins, (hydrogenated) copolymer-based ($C_5/C_9$ type) petroleum resins, (hydrogenated) dicyclopentadiene-based petroleum resins and alicyclic saturated hydrocarbon resins. Examples of the styrene-based resins include poly-α-methylstyrene, α-methylstyrene/styrene copolymer, styrene-based monomer/aliphatic monomer copolymer, styrene-based monomer/α-methylstyrene/aliphatic monomer copolymer, styrene-based monomer copolymer, and styrene-based monomer/aromatic monomer copolymer. Specific examples of the styrene-based resins include FTR6000 series and FTR7000 series (manufactured by Mitsui Chemicals, Inc.).

Of the above tackifying resins, rosin-based resins, terpene-based resins, (hydrogenated) petroleum resins and styrene-based resins are preferable from the viewpoint of appearance of high adhesive force, and of these, rosins are preferable from the viewpoint that adhesion force are enhanced. From the viewpoints of resistance to photodeterioration and inhibition of coloration and occurrence of bubbles caused by impurities, disproportionated or hydrogenated rosins having been purified by operations such as distillation, recrystallization and extraction are more preferable. These may be used alone or in combination. The softening point of the tackifying resin is preferably 50 to 150° C. from the viewpoint of appearance of high adhesive force.

Examples of the plasticizers include fatty acid esters, for example, phthalic acid esters such as dibutyl phthalate, di-n-octyl phthalate, di-2-ethylhexyl phthalate, di-n-decyl phthalate and diisodecyl phthalate, sebacic acid esters such as di-2-ethylhexyl sebacate and di-n-butyl sebacate, azelaic acid esters such as di-2-ethylhexyl azelate, and adipic acid esters such as di-2-ethylhexyl adipate and di-n-octyl adipate; paraffins such as chlorinated paraffin; glycols such as polypropylene glycol; epoxy-based high-molecular plasticizers such as epoxidized soybean oil and epoxidized linseed oil; phosphoric acid esters such as trioctyl phosphate and triphenyl phosphate; phosphorous acid esters such as triphenyl phosphite; acrylic oligomers such as poly-n-butyl (meth) acrylate and poly-2-ethylhexyl (meth)acrylate; polybutene; polyisobutylene; polyisoprene; process oil; and naphthenic oil. These may be used alone or in combination.

Examples of the fillers include inorganic fibers and organic fibers such as glass fiber and carbon fiber; and inorganic fillers such as calcium carbonate, talc, carbon black, titanium oxide, silica, clay, barium sulfate and magnesium carbonate. The addition of inorganic fibers or organic fibers imparts durability to the obtainable laminating acrylic thermoplastic polymer composition. The addition of inorganic fillers imparts heat resistance and wetherability to the obtainable laminating acrylic thermoplastic polymer composition.

When the laminating acrylic thermoplastic polymer composition of the invention is used together with a curing agent, the acrylic thermoplastic polymer composition may be suitably used as a UV curable layer or may be suitably used as a UV curable adhesive. Examples of the curing agents include photocuring agents such as UV curing agents, and thermal curing agents, such as benzoins, benzoin ethers, benzophenones, anthraquinones, benzils, acetophenones and diacetyls. Specific examples include benzoin, α-methylolbenzoin, α-t-butylbenzoin, benzoin methyl ether, benzoin ethyl ether, benzoin n-propyl ether, benzoin isopropyl ether, benzoin isobutyl ether, α-methylolbenzoin methyl ether, α-methoxybenzoin methyl ether, benzoin phenyl ether, benzophenone, 9,10-anthraquinone, 2-ethyl-9,10-anthraquinone, benzil, 2,2-dimethoxy-1,2-diphenylethan-1-one (2,2-dimethoxy-2-phenylacetophenone) and diacetyl. The curing agents may be used alone or in combination. To enhance the effect of the curing agent, there may be further added, for example, monomers such as (meth)acrylic acid, (meth) acrylic acid esters, (meth)acrylamides, (meth)acrylamide derivatives, vinyl esters, vinyl ethers and styrene derivatives; and oligomers containing any of the above monomers as constituents. Besides these monomers, crosslinking agents including bifunctional or polyfunctional monomers or oligomers may be further added.

The laminating acrylic thermoplastic polymer composition of the invention may be produced by any method without limitation. For example, the composition may be produced by mixing the components together by the use of a known mixing or kneading device such as a kneader-ruder, an extruder, a mixing roll or a Banbury mixer, at a temperature in the range of 100 to 250° C. Alternatively, the composition may be produced by dissolving the components in an organic solvent followed by mixing, and distilling away the organic solvent. The composition thus obtained may be thermally melted and laminated onto a layer that includes a plasticizer-containing polymer composition described later. Further, the composition obtained may be thermally melted and used as, for example, a hot-melt adhesive.

When the laminating acrylic thermoplastic polymer composition is produced in such a manner that the components are dissolved in an organic solvent and mixed together, and thereafter the organic solvent is distilled away, the solution may be applied onto a layer that includes a plasticizer-containing polymer composition before it is distilled to remove the organic solvent, and thereafter the organic solvent may be evaporated to form a layer on the polymer composition layer. When the composition to be used as an adhesive is produced by dissolving the components in an organic solvent followed by mixing, and distilling away the organic solvent, the solution may be applied to an adherend before it is distilled to remove the organic solvent, and thereafter the organic solvent may be evaporated and the residue may be thermally activated to form a bond. In this manner, the composition may be used as an adhesive. When the polymer composition of the invention is thermally melted during its use, it is preferable that the melt viscosity be low from the points of view of processability and handleability. When, for example, the composition is applied by a hot melt coating process, the melt viscosity at about 200° C. is preferably not more than 50,000 mPa·s, and more preferably not more than 30,000 mPa·s.

The laminating acrylic thermoplastic polymer composition of the invention obtained as described above can be obtained at a sufficiently low temperature, can be thermally activated to form a bond at a sufficiently low temperature, or can be applied by a hot melt coating at a sufficiently low temperature. These processing is preferably feasible at not more than 140° C., and more preferably at a temperature of 130 to 140° C.

The laminating acrylic thermoplastic polymer composition of the invention is suitably used in the form of, for example, a laminate which includes a part where a layer that includes the acrylic thermoplastic polymer composition is laminated on a layer that includes a plasticizer-containing polymer composition described later.

When the laminating acrylic thermoplastic polymer composition of the invention is formed into a layer by thermally melting, the layer may be shaped by a method such as, for example, an extrusion method, an injection molding method, a hot-melt coating method, a T-die method, a blown-film extrusion method, a calendar lamination method or an extrusion lamination method.

The laminate is obtained by laminating a layer including the laminating acrylic thermoplastic polymer composition of the invention and a layer including various materials. A layer that includes the laminating acrylic thermoplastic polymer composition of the invention is not only excellent in transparency and wetherability but also, when laminated in contact with a layer containing a plasticizer, is resistant to the migration of the plasticizer from such a layer. Thus, the layer is suited for constituting a laminate which includes a part where the layer including the laminating acrylic thermoplastic polymer composition is laminated on one or both sides of a layer that includes a plasticizer-containing polymer composition.

Examples of the polymer present in the plasticizer-containing polymer composition which forms the above layer include such polymers as vinyl chloride-based polymer, various rubbers including nitrile rubber, chloroprene rubber, styrene butadiene rubber, butyl rubber, acrylic rubber, polysulfide rubber and chlorohydrin rubber, polyvinylidene chloride, polyimide, polylactic acid, polystyrene, polyethylene terephthalate, triacetyl cellulose, polyvinyl alcohol, cycloolefin-based resin, styrene/methyl methacrylate copolymer, polypropylene, polyethylene, polybutene, ethylene/ vinyl acetate copolymer, polycarbonate, acrylic resins including polymethyl methacrylate, polyethylene and polypropylene, and mixtures of two or more of these polymers. The polymer may be a copolymer with various comonomers. Of these polymers, vinyl chloride-based polymer is preferable from the point of view of durability.

When the polymer composition of the invention is used as an adhesive, the adherend may be any of various materials such as paper, cellophane, polymer materials, fabrics and wood. In view of the fact that the composition has effects of preventing the migration of a migrating component present in the adherend into the adhesive layer, and preventing the consequent decrease in cohesive force and separation, the composition can exhibit its effects more prominently when used on an adherend that includes a vinyl chloride-based polymer containing a large amount of a migrating component, typically, an adherend that includes a soft vinyl chloride-based polymer obtained by adding a plasticizer to a vinyl chloride-based polymer.

In the present invention, the term vinyl chloride-based polymer means a vinyl chloride homopolymer, a vinyl chloride copolymer obtained by copolymerizing monomer components including vinyl chloride as the main monomer (the monomer with the largest mass % among the monomer components, specifically, the monomer preferably representing not less than 50 mass %, and more preferably not less than 70 mass % of the monomer components), or a chlorinated vinyl chloride-based polymer obtained by post-chlorination of such a homopolymer or copolymer.

Examples of the monomers which are copolymerized with vinyl chloride include vinyl esters such as vinyl acetate and vinyl propionate; vinylidene chloride; carboxyl group-containing monomers such as (meth)acrylic acid, maleic acid and fumaric acid, and acid anhydrides thereof (for example, maleic anhydride); (meth)acrylic acid esters having no functional groups, such as alkyl (meth)acrylate, cycloalkyl (meth)acrylate, phenyl acrylate and benzyl acrylate; (meth) acrylic acid esters having a functional group, such as ethoxyethyl (meth)acrylate, diethylaminoethyl (meth)acrylate, tetrahydrofurfuryl (meth)acrylate and phenoxyethyl (meth) acrylate; olefins (preferably, olefins having 2 to 4 carbon atoms) such as ethylene and propylene; vinyl aromatic monomers such as styrene, substituted styrene (for example, α-methylstyrene) and vinyl toluene; and acrylonitrile.

The average polymerization degree of the vinyl chloride-based polymer is usually about 600 to 3500, preferably about 800 to 2000, and more preferably about 1000 to 1300.

The vinyl chloride-based polymers may be used alone or in combination.

When the plasticizer-containing polymer composition, which forms the layer described above, includes a vinyl chloride-based polymer, the content of the vinyl chloride-based polymer in the polymer composition is preferably 10 to 90 mass %, and more preferably 50 to 80 mass %.

The plasticizer present in the plasticizer-containing polymer composition may be any common plasticizer used for polymers.

Some example plasticizers which are suitably used include phthalic acid ester-based plasticizers such as diethyl phthalate, dibutyl phthalate, diheptyl phthalate, di-2-ethylhexyl phthalate, di-n-octyl phthalate, diisononyl phthalate, diisodecyl phthalate, ditridecyl phthalate, butylbenzyl phthalate, diethyl isophthalate, dibutyl isophthalate, diheptyl isophthalate, di-2-ethylhexyl isophthalate, di-n-octyl isophthalate, diisononyl isophthalate, diisodecyl isophthalate, ditridecyl isophthalate, butylbenzyl isophthalate, diethyl terephthalate, dibutyl terephthalate, diheptyl terephthalate, di-2-ethylhexyl terephthalate, di-n-octyl terephthalate, diisononyl terephthalate, diisodecyl terephthalate, ditridecyl terephthalate and butylbenzyl terephthalate; trimellitic acid ester-based plasticizers such as tri-2-ethylhexyl trimellitate, trioctyl trimellitate and triisodecyl trimellitate; pyromellitic acid ester-based plasticizers such as tetra-2-ethylhexyl pyromellitate; citric acid derivative-based plasticizers such as tributyl acetylcitrate; maleic acid ester-based plasticizers such as di-n-butyl maleate and di-2-ethylhexyl maleate; benzoic acid ester-based plasticizers; aliphatic dibasic acid ester-based plasticizers such as adipic acid ester-based plasticizers (for example, di-2-ethylhexyl adipate, dioctyl adipate, diisononyl adipate and diisodecyl adipate), azelaic acid ester-based plasticizers (for example, di-2-ethylhexyl azelate) and sebacic acid ester-based plasticizers (for example, di-2-ethylhexyl sebacate); polyester-based plasticizers which mainly contain a low-molecular weight polyester synthesized from, for example, a dibasic acid (for example, sebacic acid, adipic acid, azelaic acid or phthalic acid) and a dihydric alcohol (for example, glycol); phosphoric acid ester-based plasticizers such as triethyl phosphate, tricresyl phosphate, triphenyl phosphate, tri-2-ethylhexyl phosphate and trixylyl phosphate; epoxy-based plasticizers such as epoxidized soybean oil, epoxidized linseed oil, epoxidized butyl stearate and epoxidized linseed oil fatty acid butyl ester; and polyether ester-based plasticizers.

Of these plasticizers, phthalic acid ester-based plasticizers, trimellitic acid ester-based plasticizers, citric acid ester-based plasticizers, aliphatic dibasic acid ester-based plasticizers, polyester-based plasticizers, phosphoric acid ester-based plasticizers and epoxy-based plasticizers are preferable, and phthalic acid ester-based plasticizers are more preferable.

Of the plasticizers, those having a solubility parameter SP (P) of 14 to 19 $(J/cm^3)^{1/2}$ are preferable for the reasons that such a plasticizer is unlikely to migrate into a layer including the laminating acrylic thermoplastic polymer composition of the invention and that the obtainable laminate attains excellent durability. Examples of the plasticizers satisfying the above solubility parameter SP (P) include di-2-ethylhexyl phthalate, dibutoxyethyl phthalate, di-2-ethylhexyl terephthalate, dibutyl adipate, 2-ethylhexyl adipate, dibutoxyethyl adipate, dibutyl sebacate, di-2-ethylhexyl sebacate, tri-2-ethylhexyl trimellitate, epoxidized soybean oil, tri-2-ethylhexyl phosphate, triethylene glycol di-2-ethylbutyrate, triethylene glycol di-2-ethylhexoate, bis[2-(2-butoxyethoxy)ethyl]adipate, dibutylcarbitol formal, butyl oleate, tributyl acetylcitrate and chlorinated paraffin. The solubility parameter SP (P) in the present invention is a value determined by the Small's estimation method described in Non Patent Literature 2 (more particularly, Non Patent Literature 3).

The SP (P) of the plasticizer and the solubility parameter SP (B) of the polymer block (B) in the acrylic block copolymer (I) present in the laminating acrylic thermoplastic polymer composition preferably satisfy the following relationship:

$$SP(B)-SP(P)>0.35,$$

more preferably satisfy the following relationship:

$$SP(B)-SP(P)>0.50, \text{ and}$$

still more preferably satisfy the following relationship:

$$SP(B)-SP(P)>0.70.$$

The satisfaction of this relationship ensures that the plasticizer is unlikely to migrate into a layer including the laminating acrylic thermoplastic polymer composition of the invention and that the obtainable laminate attains excellent durability. The solubility parameter SP (B) of the polymer block (B) is a value calculated by the method described later in Examples. Although the preferred range of the SP (B) is not particularly limited, the value is preferably 18.50 to 25.00 $(J/cm^3)^{1/2}$ from the point of view of the resistance of the layer including the laminating acrylic thermoplastic polymer composition to polar solvents such as water and alcohols, and is more preferably 18.70 to 22.00 $(J/cm^3)^{1/2}$, and particularly preferably 18.90 to 19.50 $(J/cm^3)^{1/2}$.

The plasticizers may be used alone or in combination.

The content of the plasticizer in the plasticizer-containing polymer composition is preferably 2 to 70 mass %, more preferably 5 to 50 mass %, and still more preferably 10 to 40 mass %.

While still achieving the advantageous effects of the invention, the plasticizer-containing polymer composition may contain additives such as stabilizers, UV absorbents, antioxidants, anti-aging agents, weathering stabilizers, fillers, antistatic agents, flame retardants, blowing agents, colorants, dyes, refractive index modifiers and softeners. These additives may be used alone or in combination.

The plasticizer-containing polymer composition may be produced by any method without limitation. For example, the composition may be produced by mixing the components together by the use of a known mixing or kneading device such as a kneader-ruder, an extruder, a mixing roll or a Banbury mixer, at a temperature in the range of 140 to 200° C.

When the polymer is a vinyl chloride-based polymer, such a polymer composition may be produced by any method without limitation. For example, the composition may be produced by mixing the components for such a polymer composition together by the use of a known mixing or kneading device such as a kneader-ruder, an extruder, a mixing roll or a Banbury mixer, at a temperature in the range of 50 to 250° C.

The plasticizer-containing polymer composition obtained as described above can be prepared by, for example, a hot melt coating process, and preferably can be shaped into a layer at a temperature of 140 to 200° C.

When the plasticizer-containing polymer composition is thermally melted to form a layer, the layer including the plasticizer-containing polymer composition may be prepared by a method such as, for example, a hot-melt coating method, a T-die method, a blown-film extrusion method, a calendering method or a lamination method.

When the polymer composition is used as an adhesive, the adherend including the polymer composition may be produced by a known molding method such as, for example, injection molding or extrusion. The polymer composition of the invention is suitably used in the form of an adhesive product which has an adhesive layer including the polymer composition and an adherend, for example, an adherend including a vinyl chloride-based polymer or an adherend including a soft vinyl chloride-based polymer.

The laminating acrylic thermoplastic polymer composition of the invention is suitably used for an adhesive product in the form of, for example, an adhesive layer including the polymer composition or a laminate including such an adhesive layer.

When the polymer composition of the invention is thermally melted to form an adhesive layer, the composition may be shaped into a form such as a sheet or a film by a method such as, for example, a hot-melt coating method, a T-die method, a blown-film extrusion method, a calendering method or a lamination method.

Examples of the structures of the laminates which have a part where a layer (a) that includes the laminating acrylic thermoplastic polymer composition is laminated on a layer (b) that includes the plasticizer-containing polymer composition include a two-layer structure composed of the layer (a) and the layer (b), a three-layer structure composed of two layers (a) and the layer (b) (layer (a)/layer (b)/layer (a)), and a three-layer structure composed of the layer (a) and two layers (b) (layer (b)/layer (a)/layer (b)). Examples further include a four-layer structure composed of the layers (a), the layer (b) and a layer (b') that includes a polymer composition according to the present invention which has a different formulation from the composition forming the layer (b) (layer (a)/layer (b)/layer (b')/layer (a)), a four-layer structure composed of the layers (a), the layer (b) and a layer (c) that includes a material differing from the polymer compositions of the present invention (layer (a)/layer (b)/layer (c)/layer (a)), and a five-layer structure composed of three layers (a) and two layers (b) (layer (a)/layer (b)/layer (a)/layer (b)/layer (a)).

In the laminate, the thickness ratio of the layer (a) that includes the laminating acrylic thermoplastic polymer composition to the layer (b) that includes the plasticizer-containing polymer composition is not particularly limited. From the points of view of the durability and handleability of the obtainable product, and also the adhesiveness when used as an adhesive product, the layer (a)/layer (b) ratio is preferably in the range of 1/1000 to 1000/1, and more preferably in the range of 1/200 to 200/1.

The laminate may be produced in such a manner that a layer (a) including the laminating acrylic thermoplastic polymer composition and a layer (b) including the plasticizer-containing polymer composition are formed separately and thereafter the layers are laminated together by a method such as a lamination method. Alternatively, a layer (a) may be formed directly on a layer (b), for example, the laminating acrylic thermoplastic polymer composition may be thermally melted and applied (laminated) directly onto a layer (b) to form a layer (b). Still alternatively, a layer (a) and a layer (b) may be coextruded to form a layer structure at once.

To increase the adhesion between the layer (a) and the layer (b) in the laminate of the invention, a surface of the layer (b) may be subjected beforehand to a surface treatment such as corona discharge treatment or plasma discharge treatment. An anchor layer may be formed using an adhesive resin or the like on a surface of at least one of the adhesive layer and the base layer.

Examples of resins used for the anchor layer include an ethylene/vinyl acetate copolymer, an ionomer, a block copolymer (e.g., styrene-based triblock copolymer such as SIS or SBS, and diblock copolymer), an ethylene/acrylic acid copolymer and an ethylene/methacrylic acid copolymer. One anchor layer may be formed, or two or more anchor layers may be formed.

In the formation of the anchor layer, the method to form the anchor layer is not specifically restricted: examples thereof include a method wherein a solution containing the resin is coated onto the base layer to form the anchor layer; and a method wherein a composition containing the resin or the like giving the anchor layer is thermally molten, and using the melt, the anchor layer is formed on the base layer surface by means of a T-die or the like.

The anchor layer may be formed in such a manner that the resin that will form the anchor layer and the adhesive composition of the invention are coextruded so that the anchor layer and the adhesive layer are integrally laminated on the base layer surface, or in such a manner that the resin that will form the anchor layer and the adhesive composition are laminated sequentially onto the base layer surface. In the case where the base layer is a plastic material, the plastic material that will form the base layer, the resin that will form the anchor layer and the adhesive composition may be coextruded at the same time.

The laminate having the adhesive layer and the base layer may be used as a thermosensitive adhesive sheet in which the adhesive layer is a thermosensitive adhesive layer.

An adhesive including the adhesive composition of the invention may be used in various applications. An adhesive layer including the adhesive composition may be used as an adhesive sheet by itself, and a laminate including such an adhesive layer may be used in various applications. Examples of such applications include adhesives and adhesive tapes or films for surface protection, masking, shoes, binding, wrapping/packaging, office uses, labels, decoration/display, book binding, bonding, dicing tapes, sealing, corrosion prevention/waterproofing, medical/sanitary uses, prevention of glass scattering, electrical insulation, holding and fixing of electronic equipment, production of semiconductors, optical display films, adhesive optical films, shielding of electromagnetic waves, and sealing materials of electric and electronic parts. Specific examples are given below.

The adhesives, the adhesive tapes or films, etc. for surface protection may be used for various materials such as metals, plastics, rubbers and wood, and specifically may be used for the surface protection of coating surfaces, metals during deformation processing or deep drawing, automobile parts and optical parts. Examples of the automobile parts include coated exterior plates, wheels, mirrors, windows, lights and light covers. Examples of the optical parts include various image display devices such as liquid crystal display, organic EL display, plasma display and field emission display; optical disk constitutional films such as polarizing film, polarizing plate, retardation plate, light guide panel, diffusion plate and DVD; and fine coat faceplates for electronic/optical uses.

Exemplary uses of the adhesives, the tapes, the films, etc. for masking include masking during the manufacturing of printed wiring boards or flexible printed wiring boards; masking during a plating or soldering treatment for electronic equipment; and masking during the manufacturing of vehicles such as automobiles, during the coating of vehicles and buildings, during textile printing, and during trimming of civil engineering works.

Exemplary uses of the adhesives for shoes include adhesives used to form, for example, an adhesive between a shoe body (upper) and a sole (shoe sole), a heel, an insole, decorative parts or the like, and an adhesive between an outer sole and a midsole.

Exemplary uses for binding include binding of wire harnesses, electric wires, cables, fibers, pipes, coils, windings, steel materials, ducts, plastic bags, foods, vegetables and flowering plants. Exemplary uses for packaging include heavy material packaging, packaging for export, sealing of corrugated fiberboards and can sealing. Examples of office uses include general use for office, and uses for sealing, mending of books, drawing and memorizing. Exemplary uses for labels include price display, merchandise display, tags, POP, stickers, stripes, nameplates, decoration and advertisement.

Examples of the labels include labels having such bases as, for example, papers such as paper, converted paper (paper subjected to aluminum deposition, aluminum lamination, vanishing, resin treatment or the like) and synthetic paper; and films made of cellophane, plastic materials, fabrics, wood, metals or the like. Examples of the bases include woodfree paper, art paper, cast-coated paper, thermal paper, foil paper, polyethylene terephthalate film, OPP film, polylactic acid film, synthetic paper, thermal synthetic paper and overlaminate film. Of these, the adhesive composition of the invention, because of being excellent in transparency and wetherability, may be suitably used for labels using bases made of transparent materials. Further, the adhesive composition of the invention, because of little discoloration over time, may be suitably used for thermal labels having thermal paper or thermal synthetic paper as the base.

Some example adherends for the labels include plastic products such as plastic bottles, foamed plastic cases, and containers and pipes including a soft vinyl chloride-based polymer; paper or corrugated fiberboard products such as corrugated fiberboard boxes; glass products such as glass bottles; metal products; and products made of other inorganic materials such as ceramics.

Labels which include a laminate including an adhesive layer formed of the adhesive composition of the invention have little increase in adhesion force during storage at temperatures slightly above room temperature (for example, at 60° C.) and thus can be removed without residual adhesive after use. Further, such labels can be laminated to adherends even at low temperatures (−40 to +10° C.) and do not separate even when stored at low temperatures (−40 to +10° C.).

Exemplary uses for decoration/display include danger display seals, line tapes, wiring markings, after-glow luminous adhesive tapes and reflecting sheets.

Examples of the applications as adhesive optical films include adhesive layers formed on at least part or the entirety of one or both sides of such optical films as polarizing films, polarizing plates, retardation films, viewing angle enlarging films, luminance improving films, antireflection films, antiglare films, color filters, light guide panels, diffusion films, prism sheets, electromagnetic wave shielding films, near infrared absorbing films, functional composite optical films, films for ITO lamination, impact resistance imparting films, and visibility improving films. The adhesive optical films may be such that the surface of the above optical films is protected with a protective film which is an adhesive layer formed of the inventive adhesive composition. The adhesive optical films are suitably used in various image display devices such as liquid crystal display device, PDP, organic EL display device, electronic paper, game machine and mobile terminal.

Exemplary uses for electrical insulation include protective covering or insulation of coils, and layer insulation such as motor/transformer layer insulation. Exemplary uses for holding and fixing of electrical equipment include carrier tapes, packaging, fixing of cathode ray tubes, splicing and rib reinforcement. Exemplary uses for the production of semiconductors include protection of silicon wafers. Exemplary uses for bonding include the formation of bonds in various adhesive fields, automobiles, electric trains, electric equipment, fixation of printing plates, construction, fixation of nameplates, and general household use, and the formation of bonds to rough surfaces, irregular surfaces and curved surfaces. Exemplary uses for sealing include sealing for heat insulation, vibration insulation, waterproofing, moisture proofing, soundproofing and dustproofing. Exemplary uses for corrosion prevention/waterproofing include corrosion prevention for gas pipes and water pipes, corrosion prevention for large diameter pipes, and corrosion prevention for civil engineering buildings.

Examples of medical and sanitary uses include uses for percutaneous absorbent drugs, such as analgesic anti-inflammatory agents (plasters, poultices), plasters for cold, antipruritic patches and keratin softening agents; uses for various tapes, such as first-aid plasters (containing germicide), surgical dressings/surgical tapes, plasters, hemostatic tapes, tapes for human waste disposal devices (artificial anus fixing tapes), tapes for stitching, antibacterial tapes, fixing tapings, self-adhesive bandages, adhesive tapes for oral mucosa, tapes for sporting, and depilatory tapes; uses for beauty, such as facial packs, moistening sheets for skin round the eye and keratin peel packs; binding uses in sanitary materials such as diapers and sheets for pets; cooling sheets, pocket body warmers, and uses for dust proofing, waterproofing and noxious insect capture. Exemplary uses for sealing materials of electronic/electric parts include liquid crystal monitors and solar cells.

EXAMPLES

The present invention will be described in greater detail based on further discussion such as examples hereinbelow, but it should be construed that the present invention is in no way limited to those examples.

Various properties in Examples and Comparative Examples were measured or evaluated by the following methods.

(1) Measurement of Weight-Average Molecular Weight (Mw) and Molecular Weight Distribution (Mw/Mn)

The molecular weight was determined in terms of standard polystyrenes by gel permeation chromatography (hereinafter, abbreviated as GPC).

Apparatus: GPC apparatus "HLC-8020" manufactured by TOSOH CORPORATION

Separation columns: "TSKgel GMHXL", "G4000HXL" and "G5000HXL" manufactured by TOSOH CORPORATION were connected in series.

Eluent: tetrahydrofuran

Flow rate of eluent: 1.0 ml/min

Column temperature: 40° C.

Detection method: differential refractive index (RI)

(2) Measurement of Contents of Polymer Blocks

The contents were determined by proton nuclear magnetic resonance spectroscopy ($^1$H-NMR).

Apparatus: nuclear magnetic resonance apparatus "JNM-ECX400" manufactured by JEOL Ltd.

Solvent: deuterated chloroform

In a $^1$H-NMR spectrum, signals near 3.6 ppm, 3.7 ppm and 4.0 ppm are assigned to the ester group of a methyl methacrylate unit (—O—C$\underline{H}_3$), the ester group of a methyl acrylate unit (—O—C$\underline{H}_3$), and the ester group of an n-butyl acrylate unit or a 2-ethylhexyl acrylate unit (—O—C$\underline{H}_2$—CH$_2$—CH$_2$—CH$_3$ or —O—C$\underline{H}_2$—CH (—CH$_2$—CH$_3$)—CH$_2$—CH$_2$—CH$_2$—CH$_3$), respectively. The molar ratio of these monomer units was determined from the integral ratio of these signals, and was converted into a mass ratio based on the molecular weights of the monomer units. The contents of the respective polymer blocks were thus determined.

(3) Calculation of Solubility Parameter SP (B) of Polymer Block (B)

The solubility parameter SP (B) of the polymer block (B) was determined by the Hoftyzer and Van Krevelen estimation method described in Non Patent Literature 2 (more particularly, Non Patent Literature 4). Details will be described below with reference to embodiments of Examples.

The molar molecular volumes of monomer units used in the calculation of the solubility parameters were determined by dividing the specific gravities of respective polymers at 25° C. by the molecular weights of the monomer units. The molar molecular volumes of the monomer units of methyl acrylate, n-butyl acrylate and 2-ethylhexyl acrylate were calculated to be 70.57 cm$^3$/mol, 117.91 cm$^3$/mol and 204.08 cm$^3$/mol, respectively. Using these values, the solubility parameters of polymethyl acrylate, poly-n-butyl acrylate and poly-2-ethylhexyl acrylate were calculated by the Hoftyzer and Van Krevelen estimation method to be 19.80 (J/cm$^3$)$^{1/2}$, 18.47 (J/cm$^3$)$^{1/2}$ and 16.96 (J/cm$^3$)$^{1/2}$, respectively.

When the polymer block (B) was a copolymer including a plurality of kinds of monomer units, the calculation was made using the following equation.

$$SP(B) = \sqrt{\Sigma \varphi_i \cdot \{SP(B)_i\}^2} \quad \text{[Math. 1]}$$

wherein $\varphi_i$ is the volume fraction of monomer units (i) in the polymer block (B), and SP (B)$_i$ is the solubility parameter of the polymer including the monomer units (i) determined by the Hoftyzer and Van Krevelen estimation method.

Acrylic block copolymers (I-1) and (I-2) used in Examples 1 and 2 were such that the monomer units constituting the polymer block (B) were methyl acrylate:n- butyl acrylate=50:50 (by mass)=59.82:40.18 (by mol). Since the molar molecular volumes of these monomer units are 70.57 cm³/mol for methyl acrylate and 117.91 cm³/mol for n-butyl acrylate, the volume fractions of the monomer units are calculated to be 0.4712 for methyl acrylate and 0.5288 for n-butyl acrylate. Based on these results and also because the solubility parameters of polymethyl acrylate and poly-n-butyl acrylate calculated by the Hoftyzer and Van Krevelen estimation method were 19.80 $(J/cm^3)^{1/2}$ and 18.47 $(J/cm^3)^{1/2}$, respectively, the solubility parameter SP (B) of the polymer block (B) in the acrylic block copolymers (I-1) and (I-2) used in Examples 1 and 2 was calculated to be 19.11 $(J/cm^3)^{1/2}$ using the following equation:

$$SP(B) = \sqrt{0.4712 \times (19.80)^2 + 0.5288 \times (18.47)^2} \quad \text{[Math. 2]}$$
$$= 19.11$$

Further, the plasticizer migration and the durability of the laminate described in Examples and Comparative Examples were measured by the following methods.

(1) Plasticizer Migration

Pressed sheets prepared in Examples and Comparative Examples were each punched into a disk having a diameter of 13 mm as a test piece. First, the mass of the test piece was measured as the mass ($W_1$) before soaking test. Next, the test piece was soaked in a plasticizer kept at 65° C. for 12 hours. After the test piece was taken out therefrom, the plasticizer on the surface was wiped off. The mass of the test piece was measured as the mass ($W_2$) after the soaking test. Based on the $W_1$ and $W_2$, the change in mass $(W_2-W_1)/W_1$ brought about by the soaking test was determined as the percentage. The plasticizer used herein was di-2-ethylhexyl terephthalate (solubility parameter: 18.25 $(J/cm^3)^{1/2}$) or tri-2-ethylhexyl trimellitate (solubility parameter: 18.16 $(J/cm^3)^{1/2}$).

(2) Durability of Laminates

Laminates prepared in Examples and Comparative Examples were each punched into a 100 mm×100 mm sheet as a test piece. The test piece was stored at 85° C. for 14 days. The test piece was rated as "A" when it was free from separation at the interface of the layers, and "B" when such separation was present.

Further, evaluations were carried out by the methods described below to evaluate the performance of polymer compositions obtained, as adhesives.

(1) Adhesive Force at 180°

Acrylic block copolymers produced in Synthetic Examples described later were each dissolved into toluene to give 40 mass % toluene solutions. With a coater, the solutions were each applied onto a release film (Purex A43, manufactured by Teijin DuPont Films, thickness 50 μm) so that the dry thickness of the adhesive layer would be 25 μm. Thereafter, the film was dried and heat treated at 60° C. for 30 minutes, and an adhesive tape was thus prepared. The tape was cut to 25 mm in width and 100 mm in length, and was attached onto a vinyl chloride-based polymer sheet (vinyl film sheet 0.1 mm in thickness, manufactured by AS ONE Corporation, containing di-2-ethylhexyl phthalate as a plasticizer) by allowing a 2 kg roller to move thereon back and forth two times at a speed of 10 mm/sec. Thereafter, the release film was released, and a vinyl chloride-based polymer sheet (vinyl film sheet 0.8 mm in thickness, manufactured by AS ONE Corporation, containing bis(2-ethylhexyl) phthalate as a plasticizer) was attached by allowing a 2 kg roller to move thereon back and forth two times at a speed of 10 mm/sec. After storage at room temperature for 24 hours, the laminate was peeled in 180° direction at 23° C. and a speed of 300 mm/min, and the adhesive force was measured. When stick-slip occurred, the maximum value was obtained as the adhesive force.

(2) Change in Adhesive Force with Time

Acrylic block copolymers produced in Synthetic Examples described later were each dissolved into toluene to give 40 mass % toluene solutions. With a coater, the solutions were each applied onto a polyethylene terephthalate film (TOYOBO ESTER Film E5000, thickness 50 μm) so that the dry thickness of the adhesive layer would be 25 μm. Thereafter, the film was dried and heat treated at 60° C. for 30 minutes, and an adhesive tape was thus prepared. The tape was cut to 25 mm in width and 100 mm in length, and was attached onto a vinyl chloride-based polymer sheet (vinyl film sheet 0.8 mm in thickness, manufactured by AS ONE Corporation, containing bis(2-ethylhexyl) phthalate as a plasticizer) by allowing a 2 kg roller to move thereon back and forth two times at a speed of 10 mm/sec. After storage at room temperature for 1 day and 7 days, the laminate was peeled in 180° direction at 23° C. and a speed of 300 mm/min, and the adhesive force was measured. When stick-slip occurred, the maximum value was obtained as the adhesive force.

(3) Ball Tack

Measurement was performed in accordance with JIS Z0237. Specifically, acrylic block copolymers produced in Synthetic Examples described later were each dissolved into toluene to give 40 mass % toluene solutions. With a coater, the solutions were each applied onto a release film (Purex A43, manufactured by Teijin DuPont Films, thickness 50 μm) so that the dry thickness of the adhesive layer would be 25 μm. Thereafter, the film was dried and heat treated at 60° C. for 30 minutes, and an adhesive tape was thus prepared. The adhesive tape was arranged at an inclination angle of 30°. At room temperature, a ball in accordance with the ball tack method was rolled thereon. The number of the largest ball that stopped on the adhesive tape was determined. The smaller the number of the ball, the lower the tack.

(8) Complex Viscosity

Acrylic block copolymers produced in Synthetic Examples described later were each dissolved into toluene to give 30 mass % toluene solutions. The solutions were cast to give 1 mm thick sheets. The sheets were tested under the following conditions to measure the dynamic viscoelasticity in torsional vibration and to determine the complex viscosity at 160° C.

Apparatus: "Advanced Rheometric Expansion System" manufactured by Rheometric Scientific Ltd.
Parallel plates: diameter 8 mm
Vibration mode: torsional vibration
Frequency: 6.28 rad/sec
Measurement temperature range: −50° C. to 250° C.
Heat-up rate: 3° C./min
Strains: 0.05% (−50° C. to −37° C.), 1.0% (−37° C. to −15° C.), 5.0% (−15° C. to 250° C.)

Acrylic block copolymers (I-1) to (I-6) and (II-1) to (II-5) used in Examples and Comparative Examples were synthesized by the methods described in Synthetic Examples 1 to 11 below.

《Synthetic Example 1》 [Synthesis of Acrylic Block Copolymer (I-1)]

A 2-liter three-necked flask was fitted with a three-way cock and the interior of the flask was purged with nitrogen.

Thereafter, while stirring at room temperature, the flask was loaded with 991 g of toluene and 30.4 g of 1,2-dimethoxyethane, subsequently loaded with 33.8 g of a toluene solution containing 17.0 mmol of isobutylbis(2,6-di-t-butyl-4-methylphenoxy)aluminum, and further loaded with 2.22 g of a solution of sec-butyllithium in cyclohexane containing 3.77 mmol of sec-butyllithium. Subsequently, 30.2 g of methyl methacrylate was added to this mixed solution. The reaction liquid was yellow at first but became colorless after 60 minutes of stirring at room temperature. Subsequently, the temperature inside the polymerization liquid was cooled to −30° C., and 266 g of a methyl acrylate/n-butyl acrylate mixture (50/50 by mass) was added dropwise over a period of 2 hours. After the completion of the dropwise addition, stirring was performed at −30° C. for 5 minutes. Further, 46.8 g of methyl methacrylate was added, and the mixture was stirred at room temperature overnight. The polymerization reaction was then terminated by the addition of 11.4 g of methanol. The reaction liquid obtained was poured into 15 kg of methanol to give a white precipitate. The white precipitate was recovered and dried to afford 330 g of an acrylic block copolymer (hereinafter, this copolymer will be written as the "acrylic block copolymer (I-1)").

《Synthetic Example 2》 [Synthesis of Acrylic Block Copolymer (I-2)]

The interior of a 2-liter three-necked flask was purged with nitrogen. While stirring at room temperature, the flask was loaded with 940 g of toluene and 46.6 g of 1,2-dimethoxyethane, subsequently loaded with 37.4 g of a toluene solution containing 18.8 mmol of isobutylbis(2,6-di-t-butyl-4-methylphenoxy)aluminum, and further loaded with 3.15 g of a cyclohexane solution containing 5.37 mmol of sec-butyllithium. Subsequently, 40.6 g of methyl methacrylate was added to this mixed solution. The reaction liquid was yellow at first but became colorless after 60 minutes of stirring at room temperature. Subsequently, the temperature inside the polymerization liquid was cooled to −30° C., and 265 g of a methyl acrylate/n-butyl acrylate mixture (50/50 by mass) was added dropwise over a period of 2 hours. After the completion of the dropwise addition, stirring was performed at −30° C. for 5 minutes. Further, 40.6 g of methyl methacrylate was added, and the mixture was stirred at room temperature overnight. The polymerization reaction was then terminated by the addition of 13.7 g of methanol. The reaction liquid obtained was poured into 15 kg of methanol to give a white precipitate. The white precipitate was recovered and dried to afford 330 g of an acrylic block copolymer (hereinafter, this copolymer will be written as the "acrylic block copolymer (I-2)").

《Synthetic Example 3》 [Synthesis of Acrylic Block Copolymer (I-3)]

A 2-liter three-necked flask was fitted with a three-way cock and the interior of the flask was purged with nitrogen. Thereafter, while stirring at room temperature, the flask was loaded with 936 g of toluene and 63.7 g of 1,2-dimethoxyethane, subsequently loaded with 41.0 g of a toluene solution containing 20.6 mmol of isobutylbis(2,6-di-t-butyl-4-methylphenoxy)aluminum, and further loaded with 4.65 g of a solution of sec-butyllithium in cyclohexane containing 7.93 mmol of sec-butyllithium. Subsequently, 56.7 g of methyl methacrylate was added to this mixed solution. The reaction liquid was yellow at first but became colorless after 60 minutes of stirring at room temperature. Subsequently, the temperature inside the polymerization liquid was cooled to −30° C., and 299 g of a methyl acrylate/n-butyl acrylate mixture (35/65 by mass) was added dropwise over a period of 2 hours. After the completion of the dropwise addition, stirring was performed at −30° C. for 5 minutes. Further, 65.5 g of methyl methacrylate was added, and the mixture was stirred at room temperature overnight. The polymerization reaction was then terminated by the addition of 16.8 g of methanol. The reaction liquid obtained was poured into 15 kg of methanol to give a white precipitate. The white precipitate was recovered and dried to afford 400 g of an acrylic block copolymer (hereinafter, this copolymer will be written as the "acrylic block copolymer (I-3)").

《Synthetic Example 4》 [Synthesis of Acrylic Block Copolymer (I-4)]

A 2-liter three-necked flask was fitted with a three-way cock and the interior of the flask was purged with nitrogen. Thereafter, while stirring at room temperature, the flask was loaded with 493 g of toluene and 26.1 g of 1,2-dimethoxyethane, subsequently loaded with 20.4 g of a toluene solution containing 10.2 mmol of isobutylbis(2,6-di-t-butyl-4-methylphenoxy)aluminum, and further loaded with 1.91 g of a solution of sec-butyllithium in cyclohexane containing 3.25 mmol of sec-butyllithium. Subsequently, 23.1 g of methyl methacrylate was added to this mixed solution. The reaction liquid was yellow at first but became colorless after 60 minutes of stirring at room temperature. Subsequently, the temperature inside the polymerization liquid was cooled to −30° C., and 142 g of a methyl acrylate/n-butyl acrylate mixture (20/80 by mass) was added dropwise over a period of 2 hours. After the completion of the dropwise addition, stirring was performed at −30° C. for 5 minutes. Further, 36.2 g of methyl methacrylate was added, and the mixture was stirred at room temperature overnight. The polymerization reaction was then terminated by the addition of 7.73 g of methanol. The reaction liquid obtained was poured into 15 kg of methanol to give a white precipitate. The white precipitate was recovered and dried to afford 180 g of an acrylic block copolymer (hereinafter, this copolymer will be written as the "acrylic block copolymer (I-4)").

《Synthetic Example 5》 [Synthesis of Acrylic Block Copolymer (I-5)]

A 2-liter three-necked flask was fitted with a three-way cock and the interior of the flask was purged with nitrogen. Thereafter, while stirring at room temperature, the flask was loaded with 1024 g of toluene and 28.0 g of 1,2-dimethoxyethane, subsequently loaded with 38.1 g of a toluene solution containing 19.2 mmol of isobutylbis(2,6-di-t-butyl-4-methylphenoxy)aluminum, and further loaded with 2.05 g of a solution of sec-butyllithium in cyclohexane containing 3.49 mmol of sec-butyllithium. Subsequently, 24.8 g of methyl methacrylate was added to this mixed solution. The reaction liquid was yellow at first but became colorless after 60 minutes of stirring at room temperature. Subsequently, the temperature inside the polymerization liquid was cooled to −30° C., and 275 g of a methyl acrylate/n-butyl acrylate mixture (75/25 by mass) was added dropwise over a period of 2 hours. After the completion of the dropwise addition, stirring was performed at −30° C. for 5 minutes. Further, 55.1 g of methyl methacrylate was added, and the mixture was stirred at room temperature overnight. The polymerization reaction was then terminated by the addition of 12.1 g of methanol. The reaction liquid obtained was poured into 15 kg of methanol to give a white precipitate. The white precipitate was recovered and dried to afford 340 g of an acrylic block copolymer (hereinafter, this copolymer will be written as the "acrylic block copolymer (I-5)").

《Synthetic Example 6》 [Synthesis of Acrylic Block Copolymer (I-6)]

A 2-liter three-necked flask was fitted with a three-way cock and the interior of the flask was purged with nitrogen. Thereafter, while stirring at room temperature, the flask was loaded with 1109 g of toluene and 13.8 g of 1,2-dimethoxyethane, subsequently loaded with 41.1 g of a toluene solution containing 20.7 mmol of isobutylbis(2,6-di-t-butyl-4-methylphenoxy)aluminum, and further loaded with 1.01 g of a solution of sec-butyllithium in cyclohexane containing 1.72 mmol of sec-butyllithium. Subsequently, 21.3 g of methyl methacrylate was added to this mixed solution. The reaction liquid was yellow at first but became colorless after 60 minutes of stirring at room temperature. Subsequently, the temperature inside the polymerization liquid was cooled to −30° C., and 242 g of methyl acrylate was added dropwise over a period of 2 hours. After the completion of the dropwise addition, stirring was performed at −30° C. for 5 minutes. Further, 24.8 g of methyl methacrylate was added, and the mixture was stirred at room temperature overnight. The polymerization reaction was then terminated by the addition of 11.4 g of methanol. The reaction liquid obtained was poured into 15 kg of methanol to give a white precipitate. The white precipitate was recovered and dried to afford 300 g of an acrylic block copolymer (hereinafter, this copolymer will be written as the "acrylic block copolymer (I-6)").

《Synthetic Example 7》 [Synthesis of Acrylic Block Copolymer (II-1)]

A 2-liter three-necked flask was fitted with a three-way cock and the interior of the flask was purged with nitrogen. Thereafter, while stirring at room temperature, the flask was loaded with 868 g of toluene and 43.4 g of 1,2-dimethoxyethane, subsequently loaded with 60.0 g of a toluene solution containing 40.2 mmol of isobutylbis(2,6-di-t-butyl-4-methylphenoxy)aluminum, and further loaded with 2.89 g of a solution of sec-butyllithium in cyclohexane containing 5.00 mmol of sec-butyllithium. Subsequently, 35.9 g of methyl methacrylate was added to this mixed solution. The reaction liquid was yellow at first but became colorless after 60 minutes of stirring at room temperature. Subsequently, the temperature inside the polymerization liquid was cooled to −30° C., and 240 g of n-butyl acrylate was added dropwise over a period of 2 hours. After the completion of the dropwise addition, stirring was performed at −30° C. for 5 minutes. Further, 35.9 g of methyl methacrylate was added, and the mixture was stirred at room temperature overnight. The polymerization reaction was then terminated by the addition of 3.50 g of methanol. The reaction liquid obtained was poured into 15 kg of methanol to give a white precipitate. The white precipitate was recovered and dried to afford 310 g of an acrylic block copolymer (hereinafter, this copolymer will be written as the "acrylic block copolymer (II-1)").

《Synthetic Example 8》 [Synthesis of Acrylic Block Copolymer (II-2)]

A 2-liter three-necked flask was fitted with a three-way cock and the interior of the flask was purged with nitrogen. Thereafter, while stirring at room temperature, the flask was loaded with 939 g of toluene and 44.9 g of 1,2-dimethoxyethane, subsequently loaded with 35.7 g of a toluene solution containing 17.9 mmol of isobutylbis(2,6-di-t-butyl-4-methylphenoxy)aluminum, and further loaded with 3.29 g of a solution of sec-butyllithium in cyclohexane containing 5.61 mmol of sec-butyllithium. Subsequently, 40.1 g of methyl methacrylate was added to this mixed solution. The reaction liquid was yellow at first but became colorless after 60 minutes of stirring at room temperature. Subsequently, the temperature inside the polymerization liquid was cooled to −30° C., and 297 g of 2-ethylhexyl acrylate was added dropwise over a period of 2 hours. After the completion of the dropwise addition, stirring was performed at −30° C. for 5 minutes. Further, 43.6 g of methyl methacrylate was added, and the mixture was stirred at room temperature overnight. The polymerization reaction was then terminated by the addition of 3.50 g of methanol. The reaction liquid obtained was poured into 15 kg of methanol to give a white precipitate. The white precipitate was recovered and dried to afford 370 g of an acrylic block copolymer (hereinafter, this copolymer will be written as the "acrylic block copolymer (II-2)").

《Synthetic Example 9》 [Synthesis of Acrylic Block Copolymer (II-3)]

A 2-liter three-necked flask was fitted with a three-way cock and the interior of the flask was purged with nitrogen. Thereafter, while stirring at room temperature, the flask was loaded with 868 g of toluene and 43.4 g of 1,2-dimethoxyethane, subsequently loaded with 60.0 g of a toluene solution containing 40.2 mmol of isobutylbis(2,6-di-t-butyl-4-methylphenoxy)aluminum, and further loaded with 2.07 g of a solution of sec-butyllithium in cyclohexane containing 3.54 mmol of sec-butyllithium. Subsequently, 36.6 g of methyl methacrylate was added to this mixed solution. The reaction liquid was yellow at first but became colorless after 60 minutes of stirring at room temperature. Subsequently, the temperature inside the polymerization liquid was cooled to −30° C., and 252 g of n-butyl acrylate was added dropwise over a period of 2 hours. After the completion of the dropwise addition, stirring was performed at −30° C. for 5 minutes. Further, 36.6 g of methyl methacrylate was added, and the mixture was stirred at room temperature overnight. The polymerization reaction was then terminated by the addition of 3.50 g of methanol. The reaction liquid obtained was poured into 15 kg of methanol to give a white precipitate. The white precipitate was recovered and dried to afford 310 g of an acrylic block copolymer (hereinafter, this copolymer will be written as the "acrylic block copolymer (II-3)").

《Synthetic Example 10》 [Synthesis of Acrylic Block Copolymer (II-4)]

A 2-liter three-necked flask was fitted with a three-way cock and the interior of the flask was purged with nitrogen. Thereafter, while stirring at room temperature, the flask was loaded with 942 g of toluene and 91.5 g of 1,2-dimethoxyethane, subsequently loaded with 26.3 g of a toluene solution containing 13.2 mmol of isobutylbis(2,6-di-t-butyl-4-methylphenoxy)aluminum, and further loaded with 3.88 g of a solution of sec-butyllithium in cyclohexane containing 6.62 mmol of sec-butyllithium. Subsequently, 52.9 g of methyl methacrylate was added to this mixed solution. The reaction liquid was yellow at first but became colorless after 60 minutes of stirring at room temperature. Subsequently, the temperature inside the polymerization liquid was cooled to −30° C., and 227 g of n-butyl acrylate was added dropwise over a period of 2 hours. After the completion of the dropwise addition, stirring was performed at −30° C. for 5 minutes. Further, 44.5 g of methyl methacrylate was added, and the mixture was stirred Table 1 describes the structures, weight-average molecular weights (Mw) and molecular weight distributions (Mw/Mn) of the acrylic block copolymers (I-1) to (I-6) and (II-1) to (II-5) obtained in Synthetic Examples 1 to 11 described above, as well as the contents of polymer blocks, the constituents of polymer blocks (B) and the solubility parameters of polymer blocks (B).

TABLE 1

|  | Syn. Ex. 1 | Syn. Ex. 2 | Syn. Ex. 3 | Syn. Ex. 4 | Syn. Ex. 5 | Syn. Ex. 6 | Syn. Ex. 7 | Syn. Ex. 8 | Syn. Ex. 9 | Syn. Ex. 10 | Syn. Ex. 11 |
|---|---|---|---|---|---|---|---|---|---|---|---|
| Acrylic block copolymer | (I-1) | (I-2) | (I-3) | (I-4) | (I-5) | (I-6) | (II-1) | (II-2) | (II-3) | (II-4) | (II-5) |
| Structure | (A)-(B)-(A) | (A)-(B)-(A) | (A)-(B)-(A) | (A)-(B)-(A) | (A)-(B)-(A) | (A)-(B)-(A) | (A)-(B)-(A) | (A)-(B)-(A) | (A)-(B)-(A) | (A)-(B)-(A) | (A)-(B)-(A) |
| Weight-average molecular weight (Mw) | 113,000 | 71,900 | 65,000 | 85,000 | 139,000 | 218,000 | 70,800 | 76,500 | 115,000 | 60,000 | 111,000 |
| Molecular weight distribution (Mw/Mn) | 1.10 | 1.06 | 1.09 | 1.14 | 1.10 | 1.22 | 1.17 | 1.13 | 1.09 | 1.12 | 1.11 |
| Content (mass %) of polymer block (A) | 22.5 | 23.5 | 29.0 | 29.5 | 22.5 | 16.0 | 23.5 | 22.6 | 22.0 | 30.0 | 20.5 |
| Content (mass %) of polymer block (B) | 77.5 | 76.5 | 71.0 | 70.5 | 77.5 | 84.0 | 76.5 | 77.4 | 78.0 | 70.0 | 79.5 |
| Constituents (mass ratio) of polymer block (B) | MA/nBA 50/50 | MA/nBA 50/50 | MA/nBA 35/65 | MA/nBA 20/80 | MA/nBA 75/25 | MA 100 | nBA 100 | 2EHA 100 | nBA 100 | nBA 100 | 2EHA/nBA 50/50 |
| Solubility pararameter ($(J/cm^3)^{1/2}$) of polymer block (B) | 19.11 | 19.11 | 18.91 | 18.72 | 19.45 | 19.80 | 18.47 | 16.96 | 18.47 | 18.47 | 17.66 | at room temperature overnight. The polymerization reaction was then terminated by the addition of 12.1 g of methanol. The reaction liquid obtained was poured into 15 kg of methanol to give a white precipitate. The white precipitate was recovered and dried to afford 310 g of an acrylic block copolymer (hereinafter, this copolymer will be written as the "acrylic block copolymer (II-4)").

《Synthetic Example 11》 [Synthesis of Acrylic Block Copolymer (II-5)]

A 2-liter three-necked flask was fitted with a three-way cock and the interior of the flask was purged with nitrogen. Thereafter, while stirring at room temperature, the flask was loaded with 868 g of toluene and 43.4 g of 1,2-dimethoxyethane, subsequently loaded with 60.0 g of a toluene solution containing 40.2 mmol of isobutylbis(2,6-di-t-butyl-4-methylphenoxy)aluminum, and further loaded with 2.07 g of a solution of sec-butyllithium in cyclohexane containing 3.54 mmol of sec-butyllithium. Subsequently, 36.6 g of methyl methacrylate was added to this mixed solution. The reaction liquid was yellow at first but became colorless after 60 minutes of stirring at room temperature. Subsequently, the temperature inside the polymerization liquid was cooled to −30° C., and 252 g of an n-butyl acrylate/2-ethylhexyl acrylate mixture (50/50 by mass) was added dropwise over a period of 2 hours. After the completion of the dropwise addition, stirring was performed at −30° C. for 5 minutes. Further, 36.6 g of methyl methacrylate was added, and the mixture was stirred at room temperature overnight. The polymerization reaction was then terminated by the addition of 3.50 g of methanol. The reaction liquid obtained was poured into 15 kg of methanol to give a white precipitate. The white precipitate was recovered and dried to afford 320 g of an acrylic block copolymer (hereinafter, this copolymer will be written as the "acrylic block copolymer (II-5)").

Example 1

The acrylic block copolymer (I-1) synthesized in Synthetic Example 1 was hot pressed at 200° C. into a 200 mm×200 mm×1 mm thick pressed sheet. The pressed sheet was tested by the aforementioned method to evaluate the plasticizer migration. Further, the pressed sheet and a soft vinyl chloride-based polymer sheet (thickness 0.8 mm, plasticizer: di-2-ethylhexyl phthalate (solubility parameter: 18.25 $(J/cm^3)^{1/2}$)) were hot pressed at 200° C. to form a laminate. The laminate was tested by the aforementioned method to evaluate the laminate durability. The results are described in Table 2.

Examples 2 to 6

The plasticizer migration and the laminate durability were evaluated in the same manner as in Example 1, except that the acrylic block copolymer (I-1) was replaced by any of the acrylic block copolymers (I-2) to (I-6) synthesized in Synthetic Examples 2 to 6. The results are described in Table 2.

Comparative Examples 1 to 5

The plasticizer migration and the laminate durability were evaluated in the same manner as in Example 1, except that the acrylic block copolymer (I-1) was replaced by any of the acrylic block copolymers (II-1) to (II-5) synthesized in Synthetic Examples 7 to 11. The results are described in Table 2.

Comparative Example 6

The plasticizer migration and the laminate durability were evaluated in the same manner as in Example 1, except that the acrylic block copolymer (I-1) was replaced by ethylene/ vinyl acetate copolymer (EVAFLEX EV550 manufactured by DUPONT-MITSUI POLYCHEMICALS CO., LTD., vinyl acetate content 14 mass %). The results are described in Table 2.

transferred to the adherend. In contrast, the adhesive force was moderate to low in Comparative Examples 1, 2, 4 and 5 in which the acrylic block copolymers (II-1), (II-2), (II-4) and (II-5) did not satisfy the requirements of the invention.

TABLE 2

|  |  | Ex. 1 | Ex. 2 | Ex. 3 | Ex. 4 | Ex. 5 | Ex. 6 | Comp. Ex. 1 | Comp. Ex. 2 | Com. Ex. 3 | Comp. Ex. 4 | Comp. Ex. 5 | Comp. Ex. 6 |
|---|---|---|---|---|---|---|---|---|---|---|---|---|---|
| Acrylic block copolymers | (I-1) | 100 |  |  |  |  |  |  |  |  |  |  |  |
|  | (I-2) |  | 100 |  |  |  |  |  |  |  |  |  |  |
|  | (I-3) |  |  | 100 |  |  |  |  |  |  |  |  |  |
|  | (I-4) |  |  |  | 100 |  |  |  |  |  |  |  |  |
|  | (I-5) |  |  |  |  | 100 |  |  |  |  |  |  |  |
|  | (I-6) |  |  |  |  |  | 100 |  |  |  |  |  |  |
|  | (II-1) |  |  |  |  |  |  | 100 |  |  |  |  |  |
|  | (II-2) |  |  |  |  |  |  |  | 100 |  |  |  |  |
|  | (II-3) |  |  |  |  |  |  |  |  | 100 |  |  |  |
|  | (II-4) |  |  |  |  |  |  |  |  |  | 100 |  |  |
|  | (II-5) |  |  |  |  |  |  |  |  |  |  | 100 |  |
| Ethylene/vinyl acetate copolymer (EVAFLEX EV550) |  |  |  |  |  |  |  |  |  |  |  |  | 100 |
| Plasticizer migration | Di-2-ethylhexyl terephthalate | 7% | 127% | 14% | 78% | 0.9% | 0.1% | 212% | 301% | 124% | 145% | 351% | 62% |
|  | Tri-2-ethylhexyl trimellitate | 4% | 77% | 8% | 31% | 0.4% | 0.1% | 127% | 156% | 70% | 64% | 173% | — |
| Laminate durability (85° C., 14 days) |  | A | A | A | A | A | A | B | B | B | B | B | B |

The acrylic block copolymers (I-1) to (I-6) and (II-1) to (II-5) obtained above were tested by the aforementioned methods to evaluate the properties as adhesives. The results are described in Table 3 below.

Regarding the change with time in adhesive force with respect to the vinyl chloride-based polymer, the adhesive force remained at a high level even after one week in Examples 1, 3 and 4, and the adhesive force was increased

TABLE 3

|  | Ex. 1 | Ex. 2 | Ex. 3 | Ex. 4 | Ex. 5 | Ex. 6 | Comp. Ex. 1 | Comp. Ex. 2 | Com. Ex. 3 | Comp, Ex. 4 | Comp. Ex. 5 |
|---|---|---|---|---|---|---|---|---|---|---|---|
| Block copolymer | (I-1) | (I-2) | (I-3) | (I-4) | (I-5) | (I-6) | (II-1) | (II-2) | (II-3) | (II-4) | (II-5) |
| Adhesive force to PVC (N/25 mm) | 26.2 | — | 32.6 | 34.5 | 2.5 | 0.4 | 21.2 | 7.3 | 34.8 | 20.7 | 18.1 |
| Change in adhesive force to PVC with time |  |  |  |  |  |  |  |  |  |  |  |
| Room temperature, 1 day (N/25 mm) | 17.6 | — | 17.8*, ss | 17.0* | 0.5 | 0.05 | 21.3* | 15.0 | 17.6* | 20.8* | 23.3** |
| Room temperature, 7 days (N/25 mm) | 22.8 |  | 14.3* | 15.2* | 3.3ss | 0.13 | 12.6* | 5.0 | 13.3* | 12.7* | 9.9 |
| Ball tack | 1 | 1 | 1 | 1 | 1 | 1 | 4 | 9 | 8 | 1 | 7 |
| Complex viscosity @ 160° C. (Pa · s) | 2.7E+03 | 7.3E+02 | 3.6E+02 | 1.0E+04 | 2.0E+03 | 8.0E+03 | 3.9E+03 | 8.0E+03 | 9.4E+03 | 6.3E+03 | 1.2E+04 | ss: Stick-slip
*Adhesive layer transferred to adherend
**Cohesive failure of adhesive layer From the results shown in Table 2, Examples 1 to 6 which involved the acrylic block copolymers (I-1) to (I-6) satisfying the requirements of the present invention attained low plasticizer migration. In contrast, the plasticizer migration was high in Comparative Examples 1 to 5 which used the acrylic block copolymers (II-1) to (II-5) failing to satisfy the requirements of the invention. Further, Examples 1 to 6 attained high laminate durability, while Comparative Examples 1 to 6 resulted in low laminate durability.

From the results shown in Table 3, the acrylic block copolymers (I-1), (I-3) and (I-4) of Examples 1, 3 and 4 which satisfied the requirements of the present invention attained very high adhesive force (not less than 25 N/25 mm) and were shown to have outstanding characteristics as adhesives. Here, the vinyl chloride-based polymer was used as the back substrate so that the adhesive layer would not be transferred to the adherend. In contrast, the adhesive force was moderate to low in Comparative Examples 1, 2, 4 and 5 in which the acrylic block copolymers (II-1), (II-2), (II-4) and (II-5) did not satisfy the requirements of the invention.

during one week in Examples 1, 5 and 6, while Comparative Examples 1 to 5 resulted in a cohesive failure and/or a decrease in adhesive force.

The copolymers of Examples 1 to 6 had a very low tack and were thus shown to have excellent adhesive characteristics such as, for example, easy positioning and reapplication before heating. In contrast, Comparative Examples 1 to 3 and 5 resulted in high tack.

The copolymers of Examples 1 to 3 and 5 exhibited a low complex viscosity at 160° C. and were thus shown to be processable as a hot melt at a lower temperature. In contrast, the copolymers of Comparative Examples 1 to 5 had a high complex viscosity at 160° C. and were shown to be inferior in that they need to be processed at a high temperature.

INDUSTRIAL APPLICABILITY

The laminating acrylic thermoplastic polymer composition of the invention may be laminated to a layer including a plasticizer-containing polymer composition while ensuring less migration of the plasticizer thereto, and the resultant laminate attains excellent durability.

The laminate is also flexible and excellent in wetherability, and thus may be suitably used in applications including alternatives of coatings such as automobile interior materials and automobile exterior materials, building members such as window frames, bathroom facilities, wallpaper, flooring and gutters, agricultural members such as agricultural vinyl sheets, industrial members such as automobile painting booth masking films, building masking sheets, waterproof sheets, industrial hoses, tarpaulins, surface protective films, adhesive sheets and adhesive tapes, medical members such as infusion bags and infusion tubes, stationery members such as desk mats and notebook covers, furniture decorative members such as table cloths and shower curtains, and grocery members such as gloves, shoes, bags, umbrellas and pneumatic toys.

When used as an adhesive, the laminating acrylic thermoplastic polymer composition of the invention exhibits a low melt viscosity and can adhere by a hot melt coating process at a low temperature and a heat treatment at a low temperature. In addition, the composition has a low tack. By virtue of these characteristics, an adhesive product which has an adhesive layer formed from this polymer composition can be easily removed and reapplied in the event of a failure of an attachment to an adherend. Further, because the adhesive layer comes to have a sufficiently high adhesive force when heat treated, the adhesive product, after being positioned accurately on an adherend, can be adhered to the adherend with a sufficient adhesive force. Furthermore, adhesive products such as adhesive sheets and adhesive films using the polymer composition of the invention may be wound around a core to form a roll without any protective film layer on the adhesive layer. Even in such a case, the adhesive layer is unlikely to adhere to the base layer, and therefore the roll such as an adhesive sheet or an adhesive film can be unwound and used at a worksite. The laminating acrylic thermoplastic polymer composition of the invention is useful as discussed above.

The invention claimed is:

1. A laminating acrylic thermoplastic polymer composition, which comprises an acrylic block copolymer (I) comprising a polymer block (A) consisting of methacrylic acid ester units, and a polymer block (B) comprising acrylic acid ester units; wherein
the polymer block (B) in the acrylic block copolymer (I) is a random copolymer comprising methyl acrylate and n-butyl acrylate in a mass ratio in a range of from 50/50 to 20/80, and
wherein a solubility parameter SP(B) of the polymer block (B) in the acrylic block copolymer (I) is in a range of from 18.72 to 19.11 $(J/cm^3)^{1/2}$.

2. The laminating acrylic thermoplastic polymer composition according to claim 1, wherein a content of the polymer block (A) in the acrylic block copolymer (I) is not less than 5 mass %.

3. The laminating acrylic thermoplastic polymer composition according to claim 1, wherein a weight-average molecular weight (Mw) of the acrylic block copolymer (I) is 30,000 to 300,000; and
a content of the polymer block (B) in the acrylic block copolymer (I) is 5 to 95 mass %.

4. The laminating acrylic thermoplastic polymer composition according to claim 1, wherein a weight change of the acrylic block copolymer (I) after soaking in di-2-ethylhexyl terephthalate at 65° C. for 12 hours is not more than 130%.

5. The laminating acrylic thermoplastic polymer composition according to claim 1, wherein a content of the acrylic block copolymer (I) in the laminating acrylic thermoplastic polymer composition is not less than 40 mass %.

* * * * *